(12) United States Patent
Kikuchi et al.

(10) Patent No.: US 11,729,875 B2
(45) Date of Patent: Aug. 15, 2023

(54) AUTOMOTIVE LAMP

(71) Applicant: KOITO MANUFACTURING CO., LTD., Tokyo (JP)

(72) Inventors: Satoshi Kikuchi, Shizuoka (JP);
Kentarou Murakami, Shizuoka (JP);
Toshiyuki Tsuchiya, Shizuoka (JP);
Takao Muramatsu, Shizuoka (JP);
Shohei Yanagizu, Shizuoka (JP);
Tomoyuki Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 504 days.

(21) Appl. No.: 16/925,442

(22) Filed: Jul. 10, 2020

(65) Prior Publication Data
US 2020/0339034 A1   Oct. 29, 2020

Related U.S. Application Data

(63) Continuation of application No. PCT/JP2019/000299, filed on Jan. 9, 2019.

(30) Foreign Application Priority Data

Jan. 11, 2018  (JP) .................................. 2018-002789
Feb. 2, 2018   (JP) .................................. 2018-017325

(51) Int. Cl.
*H05B 44/00*      (2022.01)
*F21S 41/143*     (2018.01)
(Continued)

(52) U.S. Cl.
CPC ........... *H05B 44/00* (2022.01); *B60Q 1/1423* (2013.01); *B60Q 1/245* (2013.01); *F21S 41/143* (2018.01);
(Continued)

(58) Field of Classification Search
CPC ........ H05B 44/00; H05B 47/20; H05B 45/30; F21S 41/143; F21S 41/65; B60Q 1/1423; B60Q 1/245
See application file for complete search history.

(56) References Cited

U.S. PATENT DOCUMENTS

2004/0080273 A1   4/2004  Ito et al.
2015/0137680 A1   5/2015  Komatsu et al.
(Continued)

FOREIGN PATENT DOCUMENTS

CN    101814728 A    8/2010
CN    103036215 A    4/2013
(Continued)

OTHER PUBLICATIONS

Machine translation of JP2014041803A (Year: 2014).*
(Continued)

*Primary Examiner* — Anne M Hines
(74) *Attorney, Agent, or Firm* — Buchanan Ingersoll & Rooney PC

(57) ABSTRACT

A scanning light source includes a light source, and scans the output light of the light source ahead of a lamp. A control apparatus controls the lighting on/off state of the semiconductor light source in synchronization with the scanning operation of the scanning light source. The control apparatus judges the presence or absence of an abnormal state with at least one from among (i) a timing immediately before switching from a lighting-on state to a lighting-off state and (ii) a timing immediately before switching from a lighting-off state to a lighting-on state as a judgment timing.

6 Claims, 14 Drawing Sheets

(51) Int. Cl.
  *F21S 41/65*   (2018.01)
  *H05B 45/30*   (2020.01)
  *B60Q 1/14*    (2006.01)
  *B60Q 1/24*    (2006.01)
  *H05B 47/20*   (2020.01)

(52) U.S. Cl.
  CPC .............. *F21S 41/65* (2018.01); *H05B 45/30* (2020.01); *H05B 47/20* (2020.01)

(56) References Cited

U.S. PATENT DOCUMENTS

| | | | |
|---|---|---|---|
| 2016/0341673 | A1 | 11/2016 | Kuchler et al. |
| 2017/0282720 | A1 | 10/2017 | Sakano et al. |
| 2017/0282786 | A1* | 10/2017 | Toda .................... F21S 41/148 |
| 2019/0008010 | A1* | 1/2019 | Tsuchiya ................. B60Q 1/34 |
| 2020/0339034 | A1 | 10/2020 | Kikuchi et al. |

FOREIGN PATENT DOCUMENTS

| | | |
|---|---|---|
| CN | 104709163 A | 6/2015 |
| CN | 106716814 A | 5/2017 |
| CN | 107107809 A | 8/2017 |
| CN | 107147294 A | 9/2017 |
| CN | 209897315 U | 1/2020 |
| CN | 209897316 U | 1/2020 |
| JP | 2004-134147 A | 4/2004 |
| JP | 5049817 B2 | 10/2012 |
| JP | 2014-041803 A | 3/2014 |
| JP | 2015-153657 A | 8/2015 |
| JP | 2015-168305 A | 9/2015 |
| WO | 2014/024385 A1 | 2/2014 |
| WO | 2016/104319 A1 | 6/2016 |
| WO | 2017/018128 A1 | 2/2017 |

OTHER PUBLICATIONS

Extended European Search Report dated Aug. 20, 2021, issued in corresponding European Application No. 19738824.2. (15 pages).
International Preliminary Report on Patentability (Form PCT/IB/373) and the Written Opinion of the International Searching Authority (Form PCT/ISA/237) dated Jul. 14, 2020, in corresponding International Application No. PCT/JP2019/000299. (17 pages).
International Search Report (Form PCT/ISA/210) dated Apr. 2, 2019, in corresponding International Application No. PCT/JP2019/000299. (6 pages).
Office Action dated Dec. 28, 2020, in corresponding Chinese Patent Application No. 201910026882.1 and English translation of the Office Action. (23 pages).
Office Action (Notification of Reason(s) for Refusal) dated Jul. 26, 2022, in corresponding Japanese Patent Application No. 2019-564708 and English translation of the Office Action. (8 pages).

\* cited by examiner

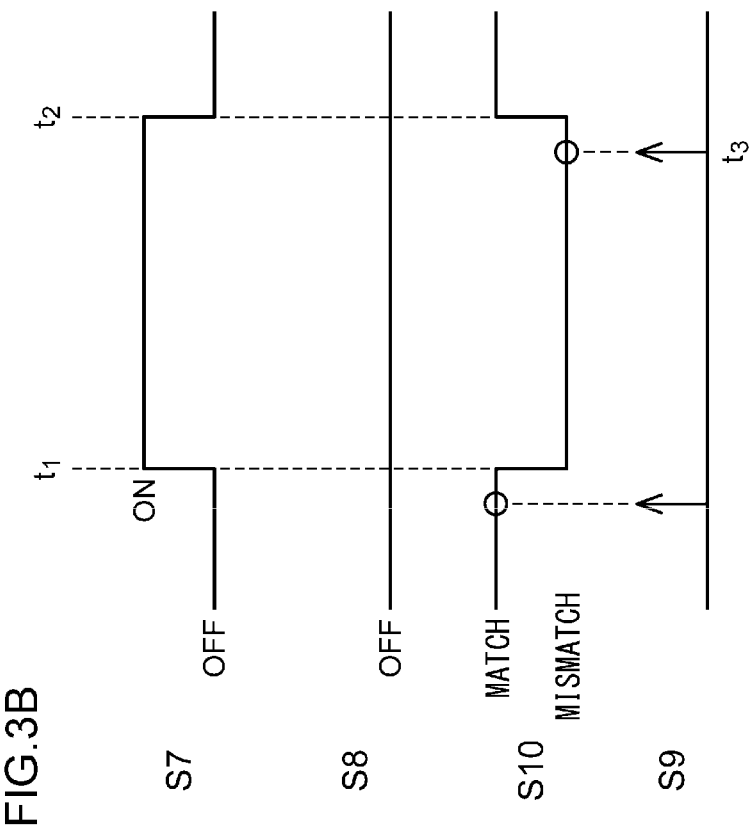
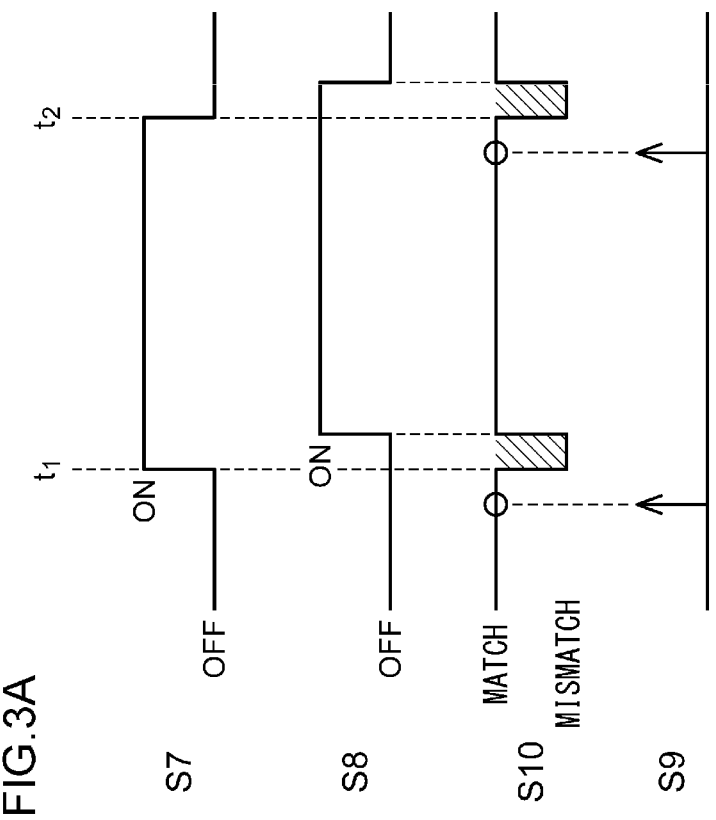

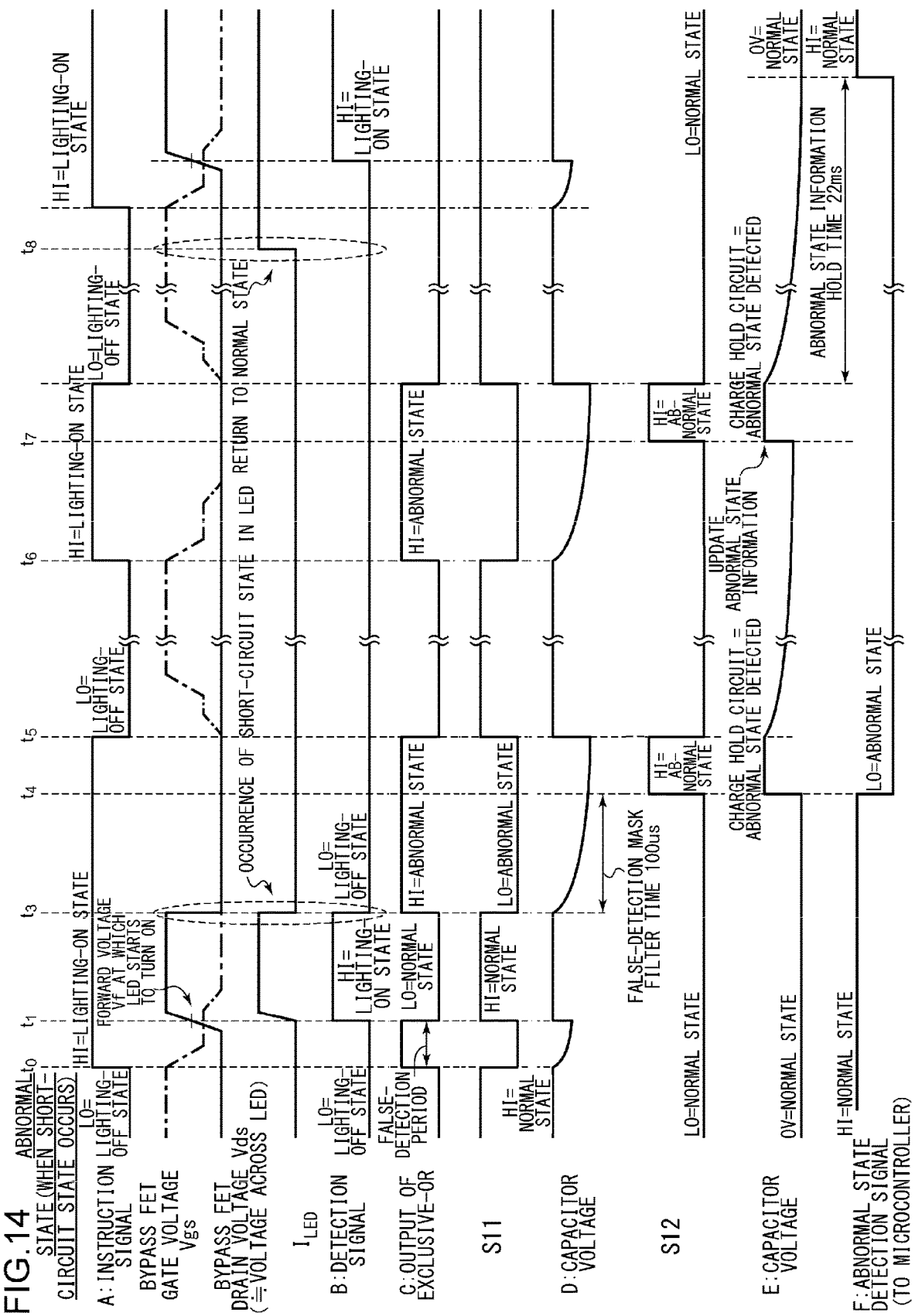

AUTOMOTIVE LAMP

BACKGROUND OF THE INVENTION

1. Field of the Invention

The present invention relates to an automotive lamp employed in a vehicle or the like.

2. Description of the Related Art

Typical automotive lamps are capable of switching between a low-beam mode and a high-beam mode. The low-beam mode is used to illuminate a close range with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, the high-beam mode has a problem of imparting glare to a driver of a vehicle or a pedestrian ahead of the vehicle.

In recent years, the ADB (Adaptive Driving Beam) technique has been proposed in which the high-beam light distribution pattern is dynamically and adaptively controlled based on the state of the surroundings of the vehicle. With the ADB technique, the presence or absence of a leading vehicle, an oncoming vehicle, or a pedestrian ahead of the vehicle is detected, and the illumination is reduced for a region that corresponds to such a vehicle or pedestrian thus detected, thereby reducing glare imparted to such a vehicle or pedestrian.

As a method for providing the ADB function, the array method and the scanning method have been known. With the array method, the screen is formed of multiple divided regions, and a light source configured to illuminate each region is turned on or off, so as to form a desired light distribution pattern. The array method has a problem in that the light distribution pattern that can be formed has a spatial resolution that is limited by the number of light sources.

On the other hand, with the scanning method, a light beam is input to a reflector (blade) that repeats a periodic movement, and the light input from the light source is reflected at an angle that corresponds to the position of the reflector so as to scan the reflected light ahead of the vehicle. The lighting on/off of the light source is changed according to the position of the reflector so as to form a desired light distribution pattern ahead of the vehicle. The scanning method has an advantage in that the spatial resolution of the light distribution pattern can be dramatically raised as compared with the array method.

Automotive lamps are required to have a function of detecting the occurrence of a malfunction in the light source and the occurrence of wiring disconnection and a short-circuit state (abnormal state detection function). As a result of investigating the abnormal state detection function employed in the scanning method, the present inventors has recognized the following problem.

For simplification of description, description will be made regarding an example in which a given light distribution pattern is generated in the form of a fixed pattern for a long period of time. With the array method, multiple light sources each provide a constant lighting on/off state or each provide a constant luminance in the lighting-on state. Accordingly, with such an arrangement, a long period of time can be used to support judgment regarding the occurrence of such an abnormal state.

With the scanning method, in a case in which the scanning frequency is set to 200 Hz, one period will be 5 ms. For example, in a case in which the light distribution pattern includes a lighting-off region of 20%, the light source turns on for 4 ms, and turns off for 1 ms. That is to say, such an arrangement is required to detect the occurrence of an abnormal state within a short period of time of 1 ms.

SUMMARY OF THE INVENTION

The present invention has been made in order to solve such a problem. Accordingly, it is an exemplary purpose of an embodiment of the present invention to provide an automotive lamp employing a scanning method that is capable of detecting the occurrence of an abnormal state.

An embodiment of the present invention relates to an automotive lamp. The automotive lamp comprises: a scanning light source comprising a semiconductor light source and structured to scan an output light of the semiconductor light source ahead of the automotive lamp; and a control apparatus structured to control a lighting on/off state of the semiconductor light source in synchronization with a scanning operation of the scanning light source. The control apparatus is structured to detect an abnormality at a judgment timing. The judgment timing is at least one from among (i) a timing immediately before switching from a lighting-on state to a lighting-off state and (ii) a timing immediately before switching from a lighting-off state to a lighting-on state as a judgment timing.

Another embodiment of the present invention also relates to an automotive lamp. The automotive lamp comprises: a scanning light source comprising a semiconductor light source and structured to scan an output light of the semiconductor light source ahead of the automotive lamp; and a control apparatus structured to control a lighting on/off state of the semiconductor light source in synchronization with a scanning operation of the scanning light source. The control apparatus comprises: a lighting on/off control unit structured to generate an instruction signal for instructing the semiconductor light source to turn on and off; a detection circuit structured to generate a detection signal that indicates whether or not the semiconductor light source is actually in a lighting-on state or a lighting-off state; and a judgment unit structured to detect an abnormality based on whether or not the state indicated by the instruction signal matches the state indicated by the detection signal.

It should be noted that any combination of the components described above, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A and 3B are time charts for explaining the operation of the automotive lamp shown in FIG. 2;

FIG. 14 is an operation waveform diagram showing the operation of the abnormal state judgment unit shown in FIG. 12 when a short-circuit state has occurred in a load.

DETAILED DESCRIPTION OF THE INVENTION OVERVIEW OF THE EMBODIMENTS

Figure 1:
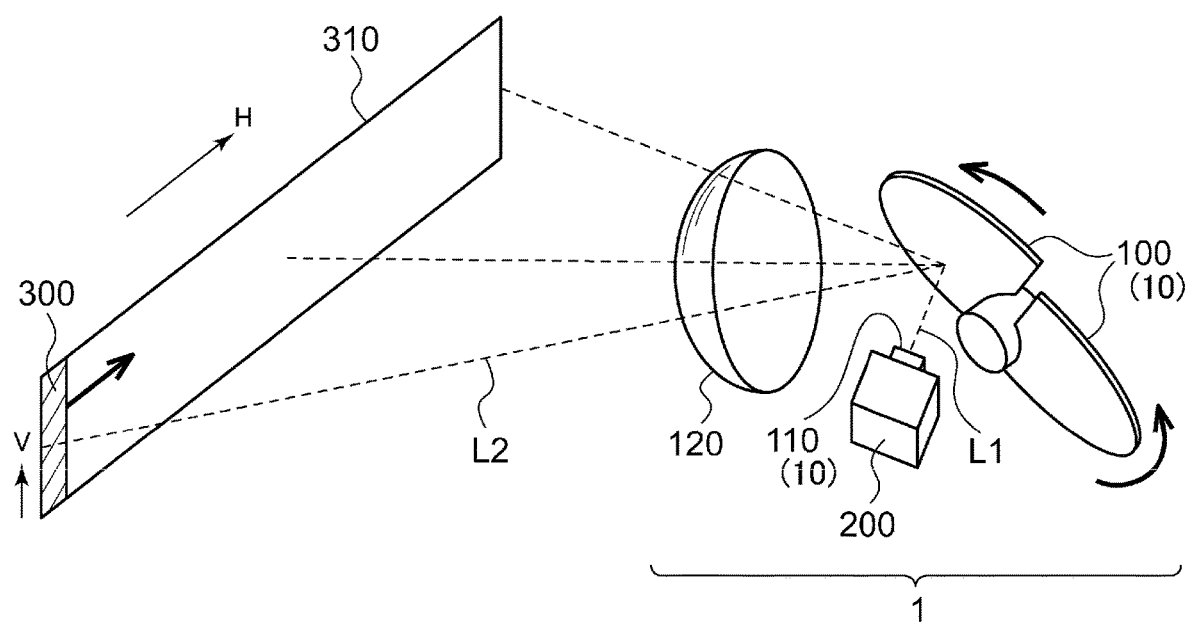
FIG. 1 is a perspective view showing a schematic configuration of an automotive lamp according to an embodiment 1.

An embodiment disclosed in the present specification (particularly, in the embodiment 1) relates to an automotive lamp. The automotive lamp comprises: a scanning light source comprising a semiconductor light source and structured to scan an output light of the semiconductor light source ahead of the automotive lamp; and a control apparatus structured to control a lighting on/off state of the semiconductor light source in synchronization with a scanning operation of the scanning light source. The control apparatus detect an abnormality with at least one from among (i) a timing immediately before switching from a lighting-on state to a lighting-off state and (ii) a timing immediately before switching from a lighting-off state to a lighting-on state as a judgment timing.

There is a delay up to a time point at which the semiconductor light source actually becomes in a stable state in response to a lighting-on or lighting-off instruction after the instruction is supplied. Furthermore, there is a delay up to a time point at which the circuit that monitors the state of the semiconductor light source becomes in a stable state. With the embodiment, a timing immediately before the switching between the lighting-on state and the lighting-off state is employed as the judgment timing. This allows an abnormal state to be detected based on a stable state of the semiconductor light source or the control apparatus. It should be noted that the "timing immediately before" may be designed with a margin in a range that does not impede the processing.

Also, the control apparatus may comprise: a lighting on/off control unit structured to generate an instruction signal for instructing the semiconductor light source to turn on and off; a detection circuit structured to generate a detection signal that indicates whether or not the semiconductor light source is actually in a lighting-on state or a lighting-off state; and a judgment unit structured to detect an abnormality at the judgment timing based on whether or not the instruction signal matches the detection signal.

Also, the lighting on/off control unit and the judgment unit may be implemented in a microcontroller. Also, the microcontroller may generate an interrupt signal immediately before the instruction signal output from the microcontroller itself is switched. Also, the microcontroller may detect the abnormality based on whether or not the instruction signal matches the detection signal. This allows the number of additional hardware components to be reduced, thereby allowing costs to be reduced.

Also, the scanning light source may further comprise a reflector structured to receive an output light from the semiconductor light source, and to repeat a predetermined periodic movement so as to scan the reflected light thereof ahead of the automotive lamp. Also, the control apparatus may employ a timing immediately before switching from the first lighting-on state to the lighting-off state and a timing immediately before switching from the first lighting-off state to the lighting-on state as the judgment timing for every scanning period. This allows the load of the microcontroller to be reduced.

Also, a lighting-off period may be inserted once for every scanning period such that the light reflected by the reflector does not illuminate both the left end and the right end of a light distribution pattern at the same time. This arrangement is capable of making judgment regarding the occurrence of an abnormal state in a sure manner at all times for every scanning period regardless of the light distribution pattern.

Also, the control apparatus may comprise a bypass switch arranged in parallel with the semiconductor light source. Also, the detection circuit may be structured to compare the voltage across the semiconductor light source with a predetermined threshold value. When the bypass switch is set to the on state, the semiconductor light source is turned off. In this state, the voltage across the semiconductor light source is substantially zero. Conversely, when the bypass switch is set to the off state, the semiconductor light source is turned on. In this state, a non-zero forward voltage occurs across the semiconductor light source. By comparing the voltage across the semiconductor light source with the threshold value, this arrangement is capable of detecting a lighting-off state that occurs in the lighting-on period, or of detecting a lighting-on state that occurs in the lighting-off period.

Also, the detection circuit may comprise a detection transistor arranged such that the voltage across the semiconductor light source is applied as a base-emitter voltage thereof or a gate-source voltage thereof. The detection signal may indicate an on/off state of the detection transistor. This allows a detection signal to be generated using a simple configuration without employing a voltage comparator or the like.

Another embodiment disclosed in the present specification (particularly, in the embodiment 2) also relates to an automotive lamp. The automotive lamp comprises: a scanning light source comprising a semiconductor light source and structured to scan an output light of the semiconductor light source ahead of the automotive lamp; and a control apparatus structured to control a lighting on/off state of the semiconductor light source in synchronization with a scanning operation of the scanning light source. The control apparatus may comprise: a lighting on/off control unit structured to generate an instruction signal for instructing the semiconductor light source to turn on and off; a detection circuit structured to generate a detection signal that indicates whether or not the semiconductor light source is actually in a lighting-on state or a lighting-off state; and a judgment unit structured to detect an abnormality based on whether or not the state indicated by the instruction signal matches the state indicated by the detection signal.

Also, the judgment unit may comprise a logic gate structured to generate an interim judgment signal that is asserted when the state indicated by the instruction signal does not match the state indicated by the detection signal.

Also, the judgment unit may further comprise a mask circuit structured to mask an assertion of the interim judgment signal that is shorter than a mask time.

Also, the judgment unit may further comprise a hold circuit structured to hold an assertion of the interim judgment signal for a hold period that is longer than each scanning period.

Also, when an assertion of the interim judgment signal remains for a predetermined judgment time, the judgment unit may judge as a final judgment that an abnormal state has occurred.

Also, the final judgment function may be implemented in a microcontroller together with the lighting on/off control unit.

Also, the control apparatus may comprise a bypass switch arranged in parallel with the semiconductor light source. Also, the detection circuit may be structured to compare the voltage across the semiconductor light source with a predetermined threshold value.

Also, the detection circuit may comprise a detection transistor arranged such that the voltage across the semiconductor light source is applied as a base-emitter voltage thereof or a gate-source voltage thereof. Also, the detection signal may indicate an on/off state of the detection transistor.

EMBODIMENTS

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Embodiment 1

FIG. 1 is a perspective view showing a schematic configuration of an automotive lamp 1 according to an embodiment 1. The automotive lamp 1 shown in FIG. 1 has an ADB function employing a scanning method. The automotive lamp 1 forms various kinds of light distribution patterns ahead of the vehicle. The automotive lamp 1 mainly includes a scanning light source 10, a projector lens 120, and a control apparatus 200.

A scanning light source 102 includes a light source 110, and scans the output light of the light source 110 ahead of the vehicle. Multiple light sources 110 may be provided. However, for ease of understanding and simplification of description, description will be made regarding an arrangement including a single light source 110. As the light source 110, a semiconductor light source such as an LED (light-emitting diode), laser diode, or the like, may be employed. The scanning light source 10 includes a reflector (which will also be referred to as a "blade") 100 in addition to the light source 110. The reflector 100 receives the output light L1 of the light source 110, and repeats a predetermined periodic movement so as to scan the reflected light L2 thereof ahead of the vehicle in the horizontal direction (H direction in the drawing). With the present embodiment, the reflector 100 is attached to a rotor of an unshown motor, and is rotationally driven. At a given time point, the input light L1 on the reflector 100 is reflected with a reflection angle that corresponds to the position (rotational angle of the rotor) of the reflector 100, which forms an illumination region 300 ahead of the vehicle. The illumination region 300 has a predetermined width in the horizontal direction (H direction) and in the vertical direction (V direction).

The reflector 100 is rotationally driven, which changes the reflection angle. This scans the position of the illumination region 300 (scanning position) in the horizontal direction (H direction). This operation is repeated at high speed, i.e., at 50 Hz or more, so as to form a light distribution pattern 310 ahead of the vehicle.

The control apparatus 200 controls the turning on/off of the light source 110 in synchronization with the scanning of the scanning light source 10, and specifically, in synchronization with the periodic movement of the reflector 100, so as to provide a desired light distribution pattern. With this, such an arrangement forms a non-zero illumination region (lighting-on region RON) and a zero illumination region (lighting-off region ROFF). The light distribution pattern 310 is configured as a combination of the lighting-on region RON and the lighting-off region ROFF. It should be noted that the control apparatus 200 may change the light amount of the light source 110 for the lighting-on region RON.

Figure 2:
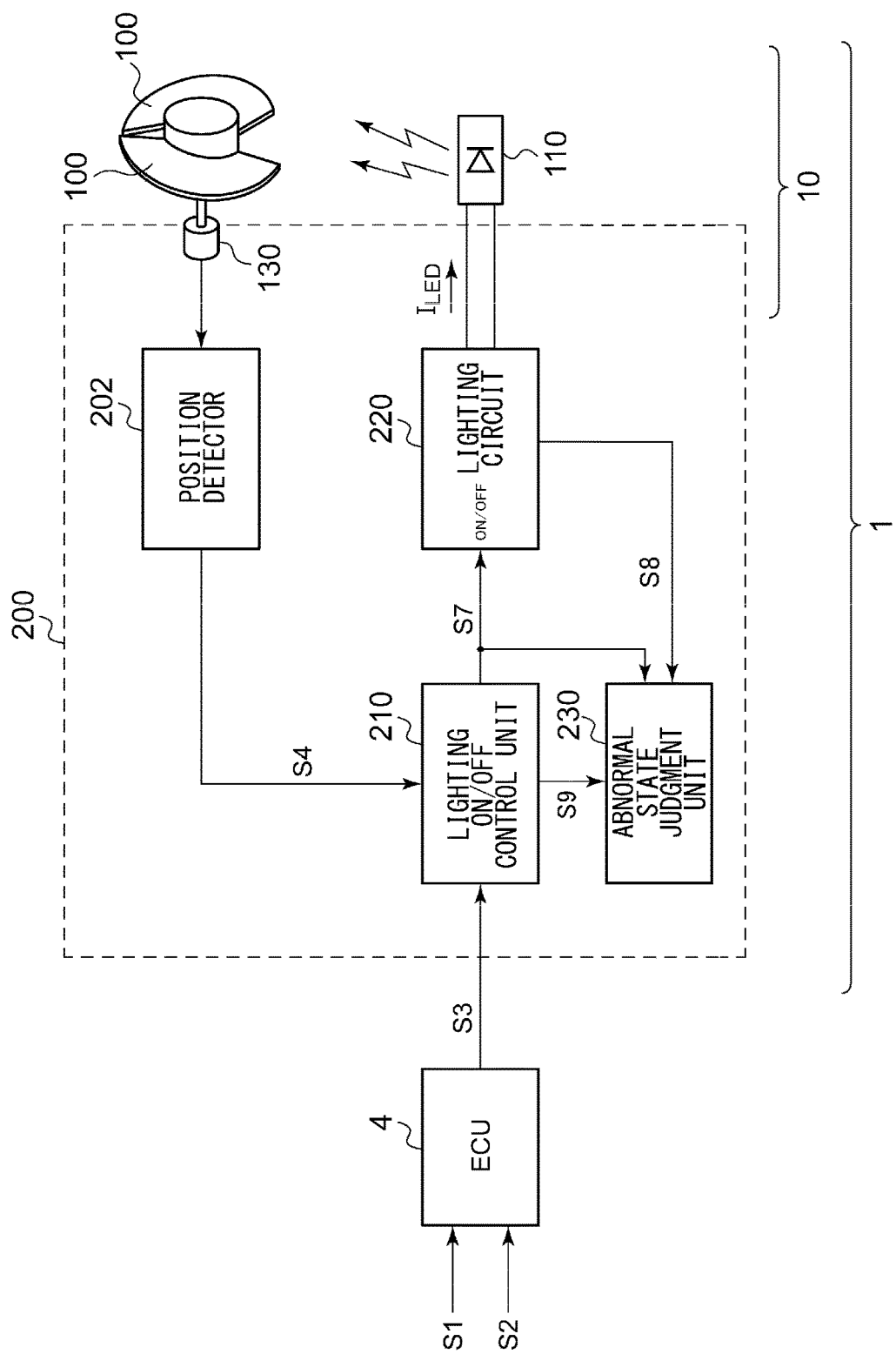
FIG. 2 is a block diagram showing a lamp system including the automotive lamp according to the embodiment 1.

Next, description will be made regarding a configuration of the control apparatus 200 of the automotive lamp 1. FIG. 2 is a block diagram showing a lamp system 2 including the automotive lamp 1 according to the embodiment 1. The lamp system 2 includes an ECU 4 and the automotive lamp 1. The ECU 4 may be mounted on the vehicle side. Also, the ECU 4 may be built into the automotive lamp 1.

The scanning light source 10 includes a motor 130 in addition to the light source 110 and the reflector 100. The reflector 100 is attached to a positioning apparatus such as the motor 130 or the like. The input angle (and the reflection angle) of the output light L1 on the reflector 100 is changed by the rotational operation of the motor 130, which scans the reflected light L2 ahead of the vehicle. The ECU 4 receives camera information S1 and vehicle information S2. The ECU 4 detects the situation ahead of the vehicle, and specifically detects the presence or absence of an oncoming vehicle, a leading vehicle, or a pedestrian ahead of the vehicle, based on the camera information S1. Furthermore, the ECU 4 detects the current vehicle speed, steering angle, etc., based on the vehicle information S2. The ECU 4 determines the light distribution pattern to be formed as illumination ahead of the vehicle, and transmits the information that indicates the light distribution pattern (light distribution pattern information) S3 to the automotive lamp 1.

The control apparatus 200 controls the on/off operation of the light source 110 based on the light distribution pattern information S3 in synchronization with the rotation of the reflector 100. For example, the control apparatus 200 mainly includes a lighting circuit 220, a lighting on/off control unit 210, a position detector 202, and an abnormal state judgment unit 230.

The position detector 202 is provided in order to detect the position of the reflector 100, i.e., the current beam scanning position. The position detector 202 generates a position detection signal S4 that indicates a timing at which a predetermined reference portion of the blade 100 passes a predetermined position. For example, the reference portion may be defined by the ends of the two reflectors 100 (a gap between them). Also, the reference portion may be defined by the center of each blade. That is to say, a desired position may be used as the reference portion.

A Hall element may be mounted on the motor 130 that rotates the reflector 100. In this case, a Hall signal output from the Hall element has a periodic waveform that corresponds to the rotor position, i.e., the blade position. The position detector 202 may detect a timing at which the polarity of the Hall signal is inverted. Specifically, the position detector 202 may be configured as a Hall comparator that compares a pair of Hall signals.

The lighting on/off control unit 210 generates an instruction signal S7 that instructs the light source 110 to turn on/off in synchronization with the movement of the reflector 100. The instruction signal S7 is configured as a binary signal that indicates the on and off states. For example, the high state corresponds to the on state, and the low state corresponds to the off state.

The lighting circuit 220 may include a constant current driver. The lighting circuit 220 generates a driving current ILED stabilized to a predetermined current level. The lighting circuit 220 is configured to be capable of switching the driving current ILED to be supplied to the light source 110, according to the instruction signal S7.

The abnormal state judgment unit 230 detects an abnormal state that occurs in the automotive lamp 1. The kinds of abnormal states to be detected are not restricted in particular. Examples of such abnormal states include at least one from among a short/open circuit state in the light source 110, a short/open circuit state in the wiring, and a malfunction or an abnormal state in the lighting circuit 220 itself.

For example, the lighting circuit 220 is configured to be capable of generating a detection signal S8 that indicates whether or not the light source 110 is actually in a lighting-on state or a lighting-off state. For example, when the light source 110 is actually in a lighting-on state, the detection signal S8 is set to the high level. Conversely, when the light source 110 is in a lighting-off state, the detection signal S8 is set to the low level. The detection method for detecting whether or not the light source 110 is in a lighting-on state or a lighting-off state is not restricted in particular.

When the automotive lamp 1 operates normally, the level of the instruction signal S7 matches the level of the detection signal S8. Conversely, when an abnormal state occurs, the level of the instruction signal S7 does not match the level of the detection signal S8. Accordingly, the abnormal state judgment unit 230 may detect an abnormality based on whether or not the two signals S7 and S8 match. The state of whether or not the two signals S7 and S8 match (or a signal that indicates the matching result) is denoted by the reference numeral S10.

The abnormal state judgment unit 230 judges the presence or absence of an abnormal state at at least one judgment timing from among (i) a timing immediately before the switching from lighting-on to lighting-off and (ii) a timing immediately before the switching from lighting-off to lighting-on. Description will be made below regarding an example in which both the timings (1) and (2) are employed as the judgment timing. The lighting on/off control unit 210 may generate a timing signal S9 that is asserted (e.g., set to the high level) immediately before the switching between lighting-on and lighting-off (i.e., immediately before the transition of the instruction signal S7). The lighting on/off control unit 210 may supply the timing signal S9 thus generated to the abnormal state judgment unit 230.

The above is the configuration of the automotive lamp 1. Next, description will be made regarding the operation thereof. FIGS. 3A and 3B are time charts for explaining the operation of the automotive lamp 1 shown in FIG. 2. FIG. 3A shows the normal operation.

At the time point t1, the instruction signal S7 transits to the high level, which is an instruction to switch from the lighting-on state to the lighting-off state. In response to this instruction, the lighting circuit 220 supplies the driving current ILED to the light source 110, which turns on the light source 110. After the light source 110 is turned on, the detection signal S8 transits to the high level.

At the time point t2, the instruction signal S7 transits to the low level, which is an instruction to switch from the lighting-on state to the lighting-off state. In response to this instruction, the lighting circuit 220 disconnects the driving current ILED, which turns off the light source 110. After the light source 110 is turned off, the detection signal S8 transits to the low level.

As shown in FIG. 3A, the detection signal S8 has a delay with respect to the instruction signal S7. Accordingly, even if the circuit operates normally, in some cases, a mismatch may occur between the detection signal S8 and the instruction signal S7 in such a period immediately after switching between the lighting-on state and the lighting-off state. In a case in which abnormal state judgment is made in a period immediately after switching between the lighting-on state and the lighting-off state, such an arrangement has a problem of false judgment that an abnormal state has occurred although the circuit operates normally.

As an approach for solving this problem, a method is conceivable in which such a mismatch period (indicated by hatching) that occurs due to such a delay is masked. However, such mask processing requires a filter circuit, a timer, or the like, which requires a large circuit area.

In contrast, with the present embodiment, the judgment timing is set to a timing immediately before switching between the lighting-on state and the lighting-off state. Such a timing immediately before switching is the time point after the longest period of time elapses after the previous switching. This provides a stable circuit state. Accordingly, there is hardly any effect due to the circuit response delay. Such an arrangement allows accurate judgment to be made.

FIG. 3B shows a situation in which the light source 110 does not turn on although an instruction to turn on has been supplied. At the time point t1, the instruction signal S7 transits to the high level, which is an instruction to switch from the lighting-off state to the lighting-on state. The lighting circuit 220 is instructed to supply the driving current ILED to the light source 110. However, the light source 110 is not able to turn on. Accordingly, the detection signal S8 remains at the low level. As a result, there is a mismatch between the instruction signal S7 and the detection signal S8 during the lighting-off period.

At the time point t2, the instruction signal S7 transits to the low level, which is an instruction to switch from the lighting-off state to the lighting-on state. The time point t3 immediately before the switching is employed as the judgment timing. At the judgment timing t3, the two signals S7 and S8 do not match. Accordingly, judgment is made that an abnormal state has occurred.

The above is the operation of the automotive lamp 1. With the automotive lamp 1, the timing immediately before the switching between the lighting-on state and the lighting-off state is employed as the judgment timing. This allows an abnormal state to be detected based on the state in which the semiconductor light source 110 and the control apparatus 200 stably operate.

This arrangement does not require a filter, timer, or the like. Such an arrangement requires only a small circuit scale to detect an abnormal state with high precision.

The present invention encompasses various kinds of apparatuses and circuits that can be regarded as a block configuration or a circuit configuration shown in FIG. 2, or otherwise that can be derived from the aforementioned description. That is to say, the present invention is not restricted to a specific configuration. More specific description will be made below regarding an example configuration for clarification and ease of understanding of the essence of the present invention and the operation thereof. That is to say, the following description will by no means be intended to restrict the technical scope of the present invention.

Figure 4:
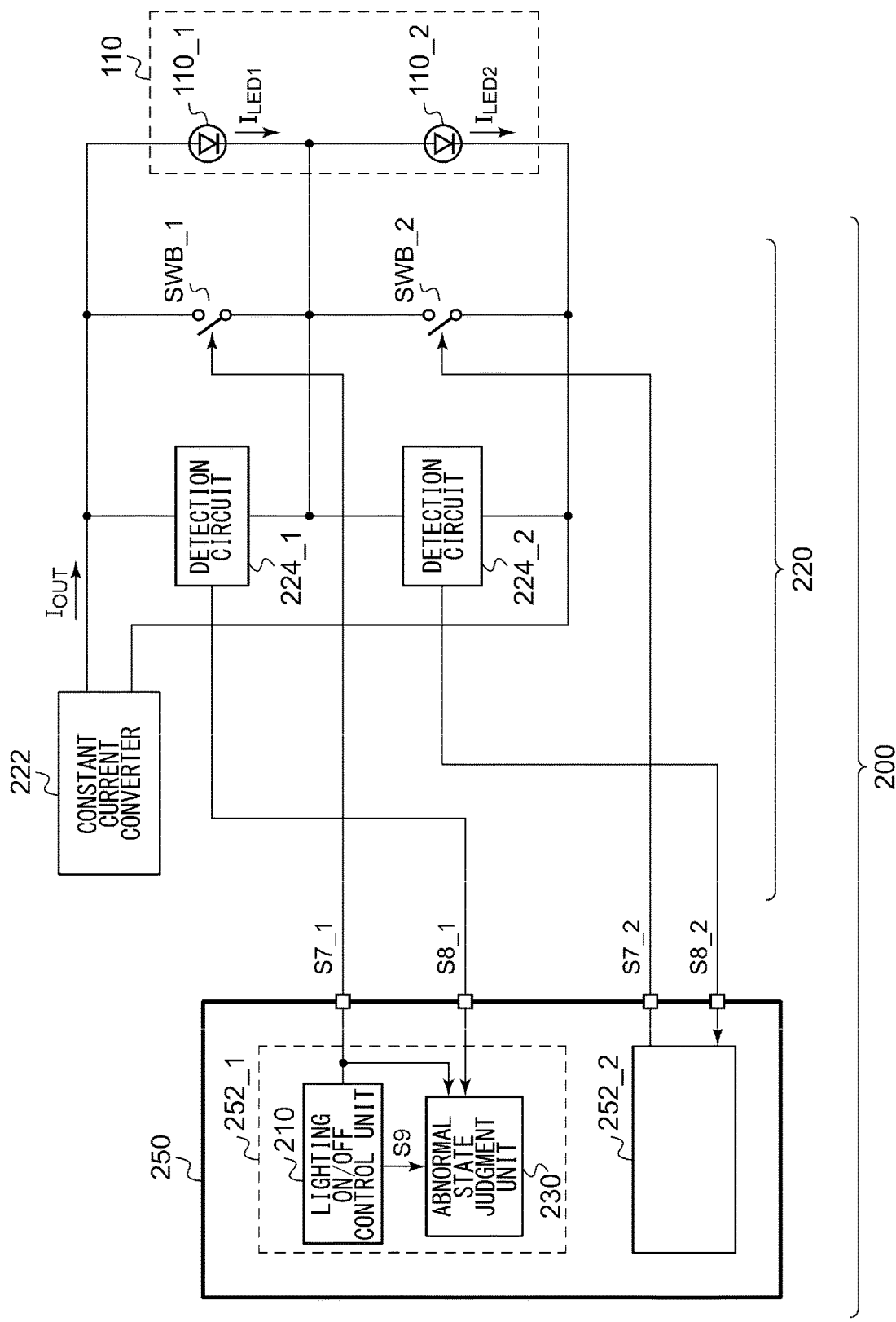
FIG. 4 is a block diagram showing an automotive lamp according to a first example configuration.

FIG. 4 is a block diagram showing the automotive lamp 1 according to a first example configuration. FIG. 4 shows only a block relating to the abnormal state judgment. That is to say, the other components such as the motor 130 and the position detector 202 are not shown.

In FIG. 4, the light source 110 includes multiple (two in this example) light sources 110_1 and 110_2 each configured such that they can be independently turned on and off. The two light sources 110_1 and 110_2 are coupled in series. The control apparatus 200 is capable of independently switching the two light sources 110_1 and 110_2 on and off in synchronization with the movement of the reflector.

The lighting circuit 220 includes a constant current converter 222, bypass switches SWB_1 and SWB_2, and detection circuits 224_1 and 224_2. The constant current converter 222 is configured as a step-down converter (Buck converter) or a step-up/step-down converter, and is configured to stabilize its output current IOUT to a predetermined current amount by feedback control.

The bypass switches SWB_1 and SWB_2 are arranged in parallel with the two light sources 110_1 and 110_2. When the bypass switch SWB_i (i=1, 2) is set to the off state, the output current IOUT of the constant current converter 222 is supplied as the driving current ILEDi to the light source 110_i, thereby turning on the light source 110_i.

When the bypass switch SWB_i (i=1, 2) is set to the on state, the output current IOUT of the constant current converter 222 is bypassed to the bypass switch SWB_i. Accordingly, this disconnects the flow of the driving current ILEDi to the light source 110_i, thereby turning off the light source 110_i.

The detection circuit 224_i (i=1, 2) detects whether or not the corresponding light source 110_i is actually in a lighting-on state or a lighting-off state, and generates a detection signal S8_i. Specifically, the detection circuit 224 is configured to be capable of comparing a predetermined threshold voltage Vth with the voltage that occurs across the corresponding light source 110. When the light source 110 is in the lighting-off state, the voltage across both electrodes thereof is substantially zero. In contrast, when the light source 110 is in the lighting-on state, the voltage across both electrodes thereof is the forward voltage Vf. Accordingly, the threshold voltage Vth may preferably be designed to satisfy the relation 0<Vth<Vf.

A combination of the lighting on/off control unit 210 and the abnormal state judgment unit 230 is arranged for each light source 110. The presence or absence of an abnormal state is judged for each light source. In FIG. 4, each combination of the lighting on/off control unit 210 and the abnormal state judgment unit 230 is implemented in a microcontroller 250. That is to say, the functions of the lighting on/off control unit 210 and the abnormal state judgment unit 230 are defined by a software program. The reference numerals 252_1 and 252_2 represent the same functions each provided for the corresponding light source.

Description will be made directing attention to the light source 110_1 and the block 252_1. The microcontroller 250 (abnormal state judgment unit 230_1) is configured to be capable of receiving an instruction signal S7_1 output from the microcontroller 250 itself and a detection signal S8_1 supplied from the detection circuit 224_1, and of detecting whether or not the instruction signal S7_1 and the detection signal S8_1 match. The microcontroller 250 (lighting on/off control unit 210_1) generates an interrupt signal (which corresponds to the timing signal S9 described above) immediately before the instruction signal S7_1 is switched. In this stage, judgment is made regarding the presence or absence of an abnormal state based on whether or not the instruction signal S7_1 and the detection signal S8_1 match. The same can be said of the combination of the light source 110_2 and the block 252_2.

The functions of the lighting on/off control unit 210 and the abnormal state judgment unit 230 are implemented in the microcontroller 250 as a software program, thereby allowing the number of components to be reduced.

Figure 5:
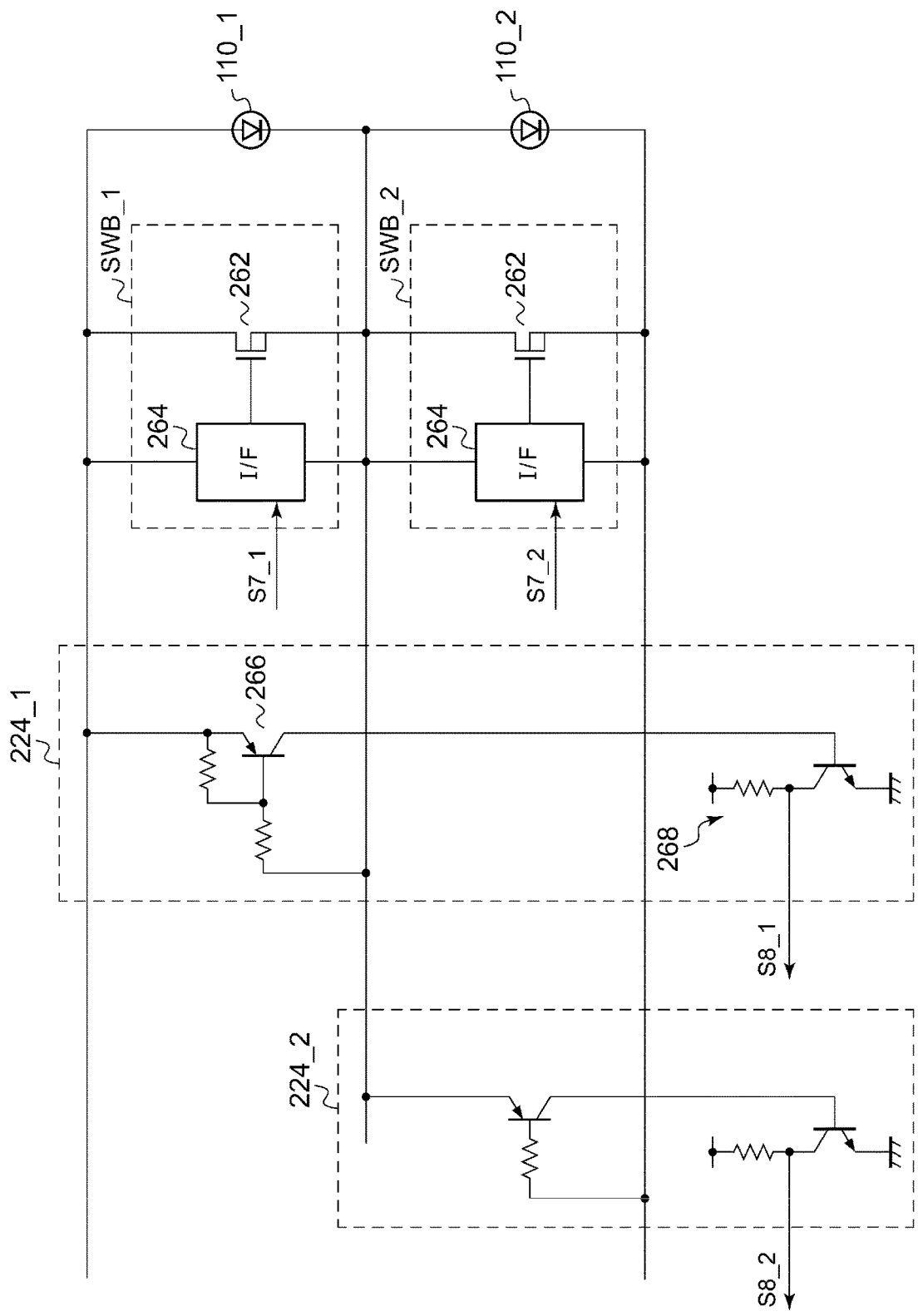
FIG. 5 is a circuit diagram showing an example configuration of a detection circuit and a bypass switch.

FIG. 5 is a circuit diagram showing a configuration example of the detection circuits 224 and the bypass switches SWB. The bypass switch SWB includes a MOS transistor 262 and an interface circuit 264. The MOS transistor 262 is arranged such that its source is coupled to the cathode of the corresponding light source 110, and its drain is coupled to the anode of the corresponding light source 110. The interface circuit 264 is configured as a level shifter. The interface circuit 264 appropriately level-shifts the instruction signal S7, so as to generate a gate signal for the MOS transistor 262.

The detection circuit 224 includes a detection transistor 266 and an inverter 268. The detection transistor is configured as a PNP bipolar transistor. The voltage across the light source 110 is applied as a base-emitter voltage of the detection transistor 266. When the light source 110 enters the lighting-on state after the driving current ILED is supplied to the light source 110, the forward voltage Vf is applied as a base-emitter voltage of the detection transistor 266. This turns on the detection transistor 266, whereby a collector current flows. The inverter 268 receives the collector current that flows through the detection transistor 266, and converts the collector current into the detection signal S8 configured as a binary signal that is switchable between the high level and the low level. The detection signal S8 indicates the on/off state of the detection transistor 266.

Figure 6A:
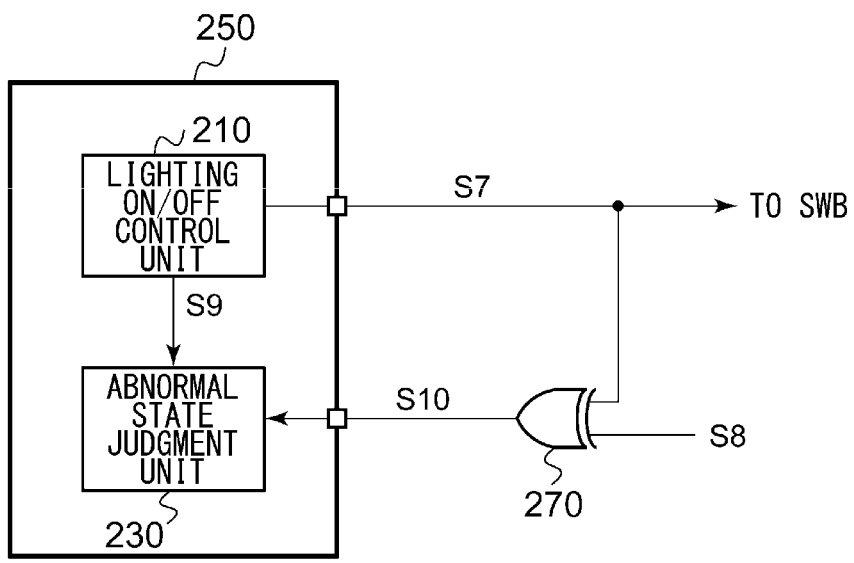
FIGS. 6A and 6B are block diagrams showing a part of an automotive lamp according to second and third example configurations.

FIG. 6A is a block diagram showing an automotive lamp 1 according to a second example configuration. With this configuration example, a part of the functions of the abnormal state judgment unit 230 is provided as a hardware component. Specifically, a function of determining whether or not the instruction signal S7 matches the detection signal S8 is provided by a logic gate 270 (e.g., XOR gate). The judgment signal S10 is input to the microcontroller 250. An interrupt is generated at a timing immediately before the lighting on/off control unit 210 switches the instruction signal S7. The abnormal state judgment unit 230 acquires the judgment signal S10 input to a pin at the interrupt timing, so as to judge the presence or absence of an abnormal state.

Figure 6B:
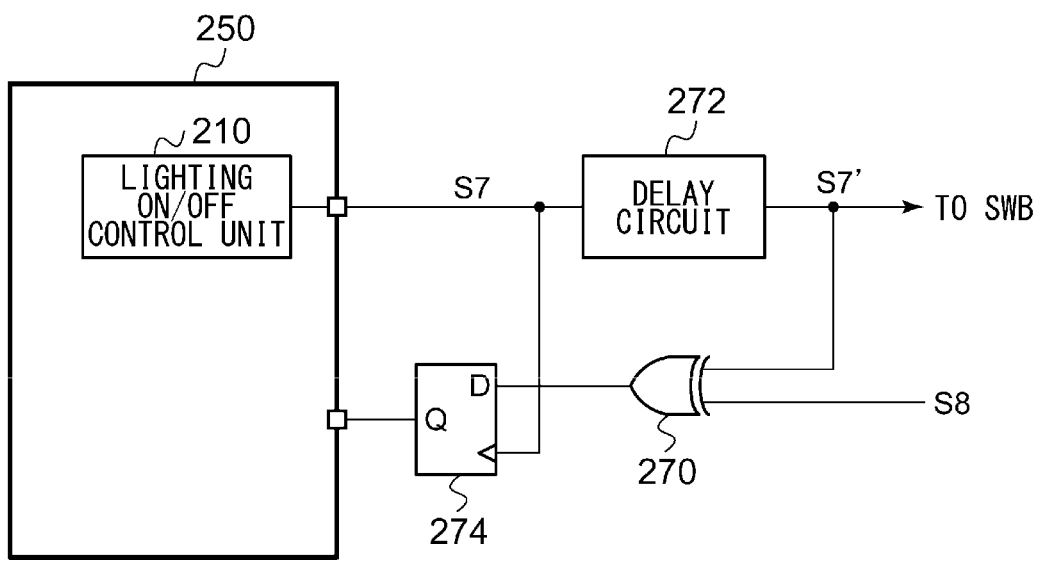

FIG. 6B is a block diagram showing a part of the automotive lamp 1 according to a third configuration example. With this example configuration, the function of the abnormal state judgment unit 230 is provided by a hardware component. The instruction signal S7 generated by the lighting on/off control unit 210 is supplied to the bypass switch SWB via the delay circuit 272. Accordingly, an instruction signal S7' thus delayed is employed as an instruction signal to switch the lighting on/off state.

The logic gate 270 generates the judgment signal S10 which indicates whether or not the instruction signal S7' and the detection signal S8 match. A flip-flop (or latch) 274 latches the judgment signal S10 at a transition timing of the instruction signal S7 that has not been delayed. The instruction signal S7 transits before the delayed instruction signal S7'. Accordingly, the instruction signal S7 can be employed as the timing signal S9 that indicates the judgment timing to be defined at a time point immediately before the switching of the lighting on/off state. With the configuration shown in FIG. 6B, only the switching from the lighting-off state to the lighting-on state is employed as a monitoring target. Also, in a case in which a signal that corresponds to the negative edge of the instruction signal S7 is supplied to the gate of the flip-flop 274, the switching from the lighting-on state to the lighting-off state may be employed as the monitoring target.

Next, description will be made regarding an example setting of the judgment timing. As shown in FIG. 2, the scanning light source 10 includes multiple reflectors 100 arranged with a gap between them. In this case, in a case in which the output light of the light source 110 is input to the two reflectors 100 across the gap between them, the left end and the right end of the light distribution pattern are illuminated at the same time. This requires a complicated lighting on/off control operation for the light source. Alternatively, this becomes a factor leading to disturbance of the light distribution pattern. In order to solve such a problem, the lighting on/off control unit 210 inserts a lighting-off period (which will be referred to as a "forced lighting-off period") once for every scanning period such that the light reflected by the reflector 100 does not illuminate the left end and the right end of the light distribution pattern at the same time. In this example, the forced lighting-off period is provided such that the output light of the light source 110 does not strike the two reflectors 100 at the same time.

Figure 7A:
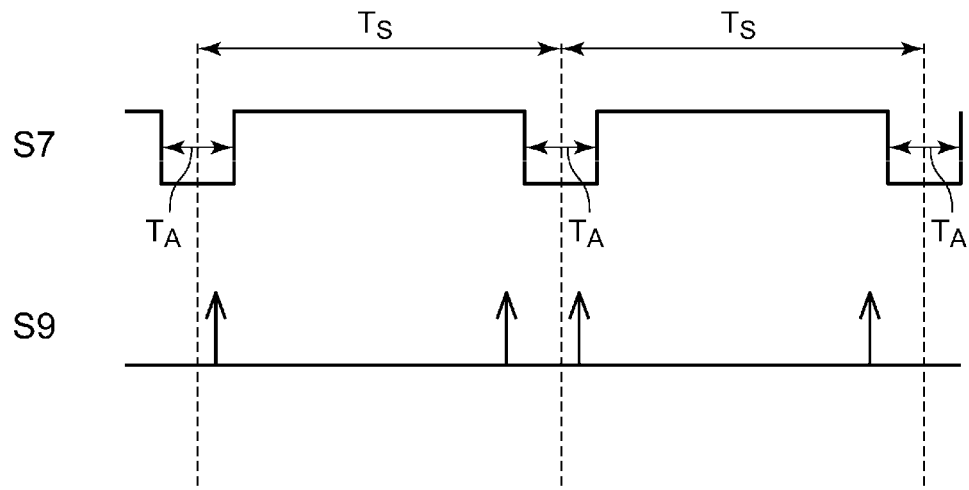
FIGS. 7A and 7B are time charts for explaining a lighting on/off control operation and a judgment timing.
Figure 7B:
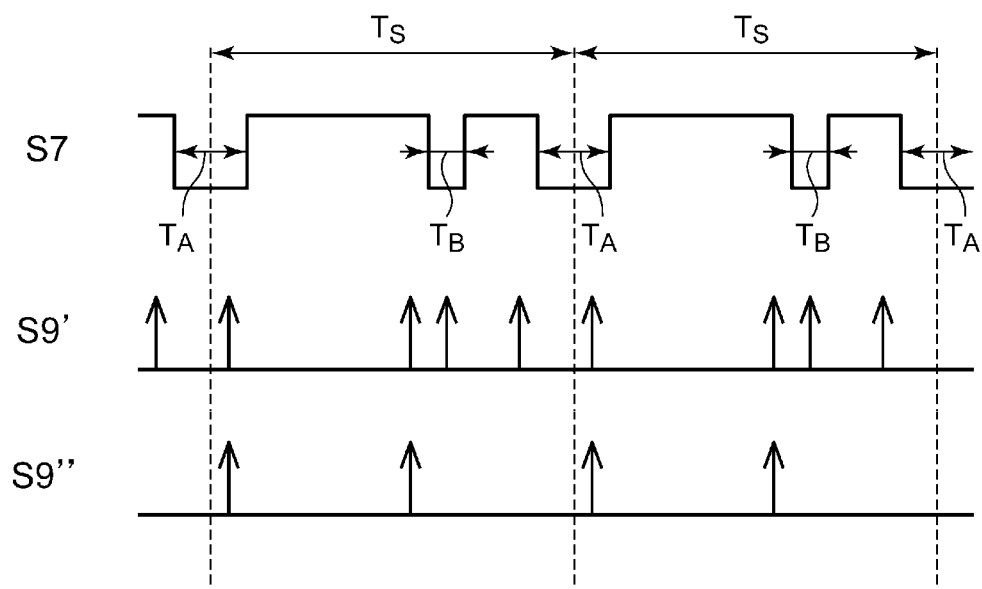

FIGS. 7A and 7B are time charts for explaining the lighting on/off control operation and the judgment timing. Here, "TS" represents the scanning period. The forced lighting-off period TA is inserted across the boundary between the adjacent scanning periods. In this period, the instruction signal S7 is set to the low level.

In a case in which such a forced lighting-off period TA is inserted, as shown in FIG. 7A, switching from the lighting-on state to the lighting-off period and switching from the lighting-off state to the lighting-on period is always provided once in each scanning period, regardless of the light distribution pattern. Accordingly, by employing a time point immediately before such switching as the judgment timing, this arrangement is capable of detecting an abnormal state in a sure manner.

As shown in FIG. 7B, in a case of generating a particular light distribution pattern, such an arrangement involves one or multiple lighting-off periods TB in addition to the forced lighting-off period TA. In this case, as indicated by S9', all the lighting on/off switching time points may be employed as the judgment time periods. In some cases, such an arrangement leads to the occurrence of an excessively heavy load of the microcontroller 250.

In order to solve such a problem, as indicated by S9", in each scanning period TS, a time point immediately before the occurrence of the switching from the first lighting-on to lighting-off and a time point immediately before the occurrence of the switching from the first lighting-off to lighting-on may each be employed as the judgment timing. With this, even in a case in which there is a large number of lighting-off periods TB in each scanning period TS, this arrangement is capable of suppressing an increase in the load of the microcontroller 250.

Embodiment 2

Figure 8:
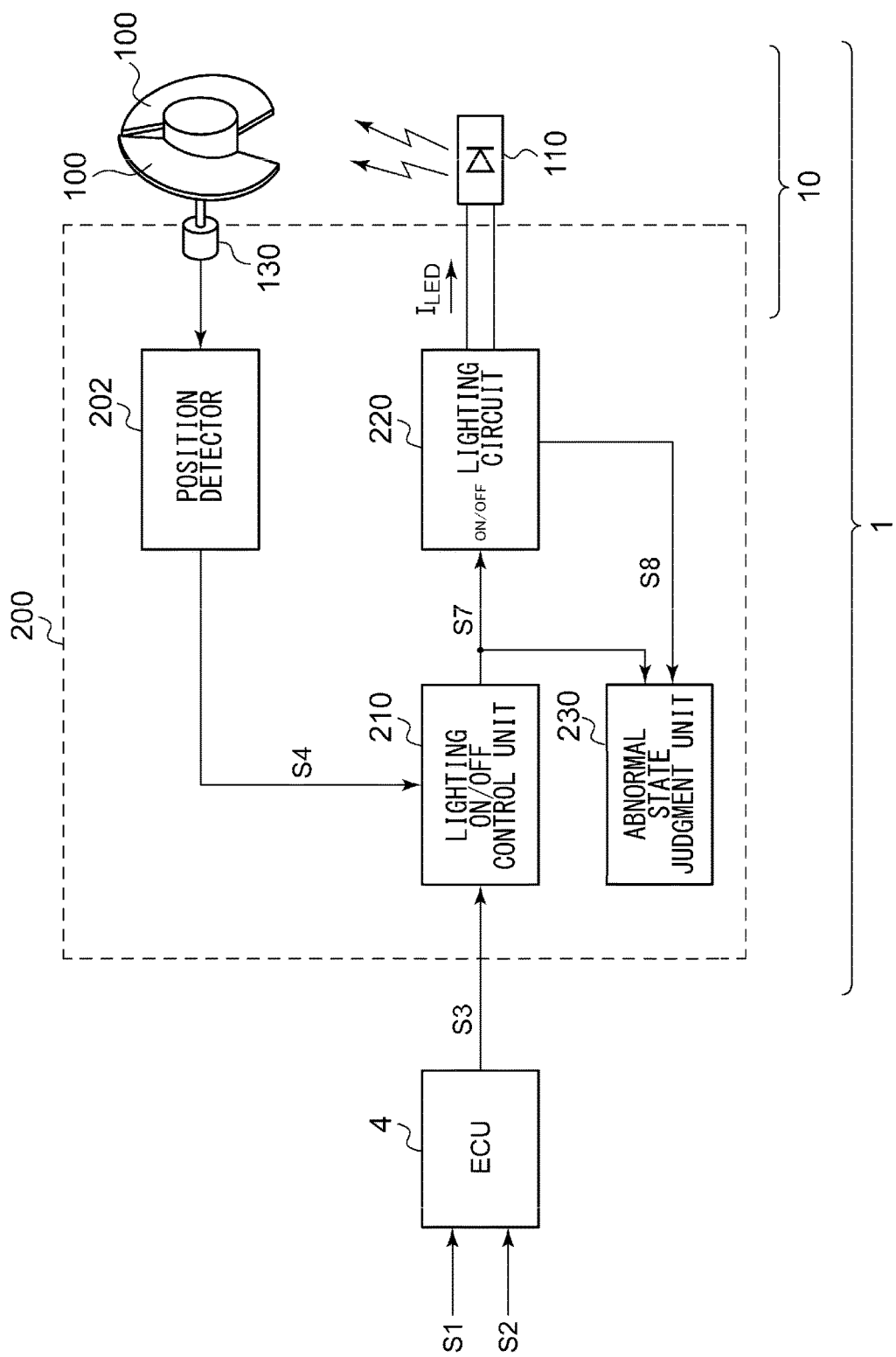
FIG. 8 is a block diagram showing a lamp system including an automotive lamp according to an embodiment 2.

FIG. 8 is a block diagram showing a lamp system 2 including the automotive lamp 1 according to an embodiment 2. The lamp system 2 includes an ECU 4 and the automotive lamp 1. The ECU 4 may be mounted on the vehicle side. Also, the ECU 4 may be built into the automotive lamp 1.

The scanning light source 10 includes a motor 130 in addition to the light source 110 and the reflector 100. The reflector 100 is attached to a positioning apparatus such as the motor 130 or the like. The input angle (and the reflection angle) of the output light L1 on the reflector 100 is changed by the rotational operation of the motor 130, which scans the reflected light L2 ahead of the vehicle. The ECU 4 receives camera information S1 and vehicle information S2. The ECU 4 detects the situation ahead of the vehicle, and specifically detects the presence or absence of an oncoming vehicle, a leading vehicle, or a pedestrian ahead of the vehicle, based on the camera information S1. Furthermore, the ECU 4 detects the current vehicle speed, steering angle, etc., based on the vehicle information S2. The ECU 4 determines the light distribution pattern to be formed as illumination ahead of the vehicle, and transmits the information that indicates the light distribution pattern (light distribution pattern information) S3 to the automotive lamp 1.

The control apparatus 200 controls the on/off operation of the light source 110 based on the light distribution pattern information S3 in synchronization with the rotation of the reflector 100. For example, the control apparatus 200 mainly includes a lighting circuit 220, a lighting on/off control unit 210, a position detector 202, and an abnormal state judgment unit 230.

The position detector 202 is provided in order to detect the position of the reflector 100, i.e., the current beam scanning position. The position detector 202 generates a position detection signal S4 that indicates a timing at which a predetermined reference portion of the blade 100 passes a predetermined position. For example, the reference portion may be defined by the ends of the two reflectors 100 (a gap between them). Also, the reference portion may be defined by the center of each blade. That is to say, a desired position may be used as the reference portion.

A Hall element may be mounted on the motor 130 that rotates the reflector 100. In this case, a Hall signal output from the Hall element has a periodic waveform that corresponds to the rotor position, i.e., the blade position. The position detector 202 may detect a timing at which the polarity of the Hall signal is inverted. Specifically, the position detector 202 may be configured as a Hall comparator that compares a pair of Hall signals.

The lighting on/off control unit 210 generates an instruction signal S7 that instructs the light source 110 to turn on/off in synchronization with the movement of the reflector 100. The instruction signal S7 is configured as a binary signal that indicates the on and off states. For example, the high state corresponds to the on state, and the low state corresponds to the off state.

The lighting circuit 220 may include a constant current driver. The lighting circuit 220 generates a driving current ILED stabilized to a predetermined current level. The lighting circuit 220 is configured to be capable of switching the driving current ILED to be supplied to the light source 110, according to the instruction signal S7.

The abnormal state judgment unit 230 detects an abnormal state that occurs in the automotive lamp 1. The kinds of abnormal states to be detected are not restricted in particular. Examples of such abnormal states may include a short/open circuit state in the light source 110, a short/open circuit state in the wiring, and a malfunction or an abnormal state in the lighting circuit 220 itself.

For example, the lighting circuit 220 is configured to be capable of generating a detection signal S8 that indicates whether or not the light source 110 is actually in a lighting-on state or a lighting-off state. For example, when the light source 110 is actually in a lighting-on state, the detection signal S8 is set to the high level. Conversely, when the light source 110 is in a lighting-off state, the detection signal S8 is set to the low level. The detection method for detecting whether or not the light source 110 is in a lighting-on state or a lighting-off state is not restricted in particular.

The abnormal state judgment unit 230 judges the presence or absence of an abnormal state based on the matching result between the state (lighting-on/lighting-off) indicated by the instruction signal S7 and the state (lighting-on/lighting-off) indicated by the detection signal S8. With the present embodiment, when the automotive lamp 1 operates normally, the level of the instruction signal S7 matches the level of the detection signal S8. Conversely, when an abnormal state occurs, the level of the instruction signal S7 does not match the level of the detection signal S8. Accordingly, the abnormal state judgment unit 230 may judge the presence or absence of an abnormal state based on whether or not the two signals S7 and S8 match.

FIGS. 8A through 9C are time charts relating to the abnormal state detection for the automotive lamp 1. The match/mismatch state of the two signals S7 and S8 (or an interim judgment signal that indicates the match/mismatch state) is indicated by the reference numeral S10. When the two signals S7 and S8 match (i.e., when the automotive lamp 1 operates normally), the interim judgment signal (interim judgment state) S10 is set to the low level. Conversely, when the two signals S7 and S8 do not match (i.e., when an abnormal state has occurred), the interim judgment signal (interim judgment state) S10 is set to the high level.

Figure 9A:
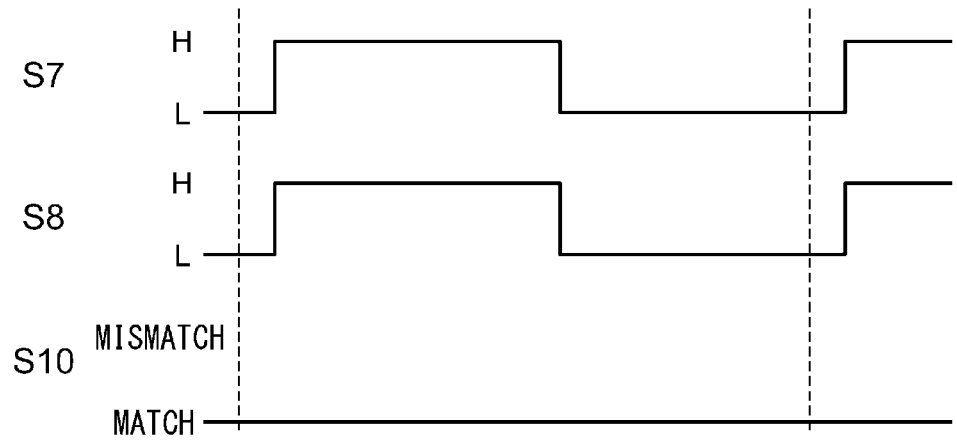
FIGS. 9A through 9C are time charts with respect to abnormal state detection supported by the automotive lamp.

FIG. 9A shows a normal state. In the normal state, the logical level of the instruction signal S7 always matches that of the detection signal S8. It should be noted that there is a delay from the transition of the instruction signal S7 to a time point at which the detection signal S8 becomes in a stable state after the actual switching of the state of the light source 110. However, detailed description thereof will be made later. Description is being made assuming that such a delay is negligible.

Figure 9B:
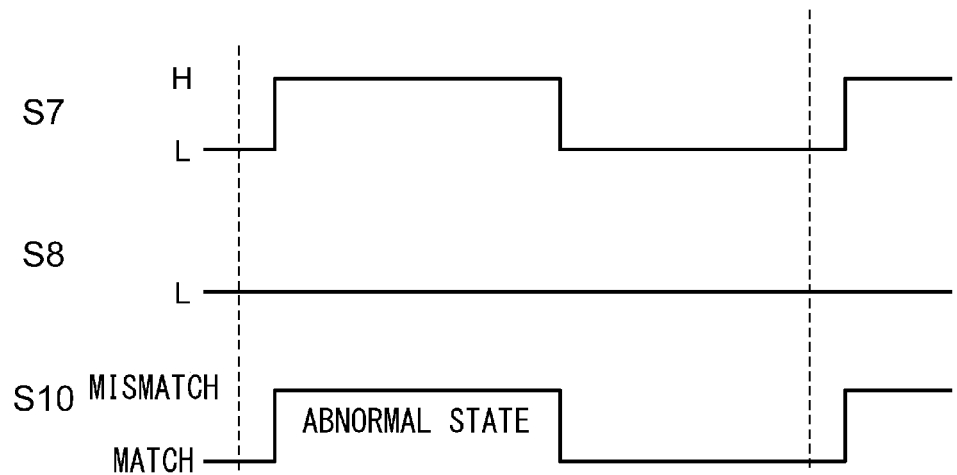

FIG. 9B shows an abnormal state in which an abnormal state has occurred in which, although a lighting-on instruction is supplied to the light source 110, the light source 110 is not actually emitting light. Such an abnormal state can occur due to the occurrence of a short-circuit state in the load (i.e., light source 110).

Figure 9C:
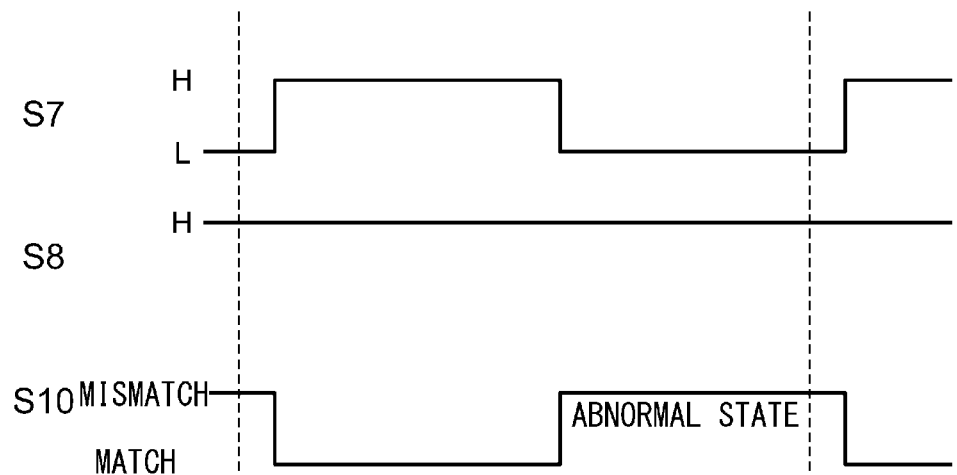

FIG. 9C shows an abnormal state in which, although a lighting-off instruction is supplied to the light source 110, the light source 110 is not actually turned off. Such an abnormal mode can occur due to an abnormal state that occurs in a switch or a circuit configured to control the lighting on/off state.

The above is the operation of the automotive lamp 1. With the automotive lamp 1, the match/mismatch of the instruction signal S7 and the detection signal S8 is continuously monitored at all times for every switching between the lighting-on period and the lighting-off period that occurs over time. This arrangement allows an abnormal state that can occur in the light source 110 or the lighting circuit 220 to be detected with high speed and in a sure manner.

The present invention encompasses various kinds of apparatuses and circuits that can be regarded as a block configuration or a circuit configuration shown in FIG. 8, or otherwise that can be derived from the aforementioned description. That is to say, the present invention is not restricted to a specific configuration. More specific description will be made below regarding an example configuration for clarification and ease of understanding of the essence of the present invention and the operation thereof. That is to say, the following description will by no means be intended to restrict the technical scope of the present invention.

Figure 10:
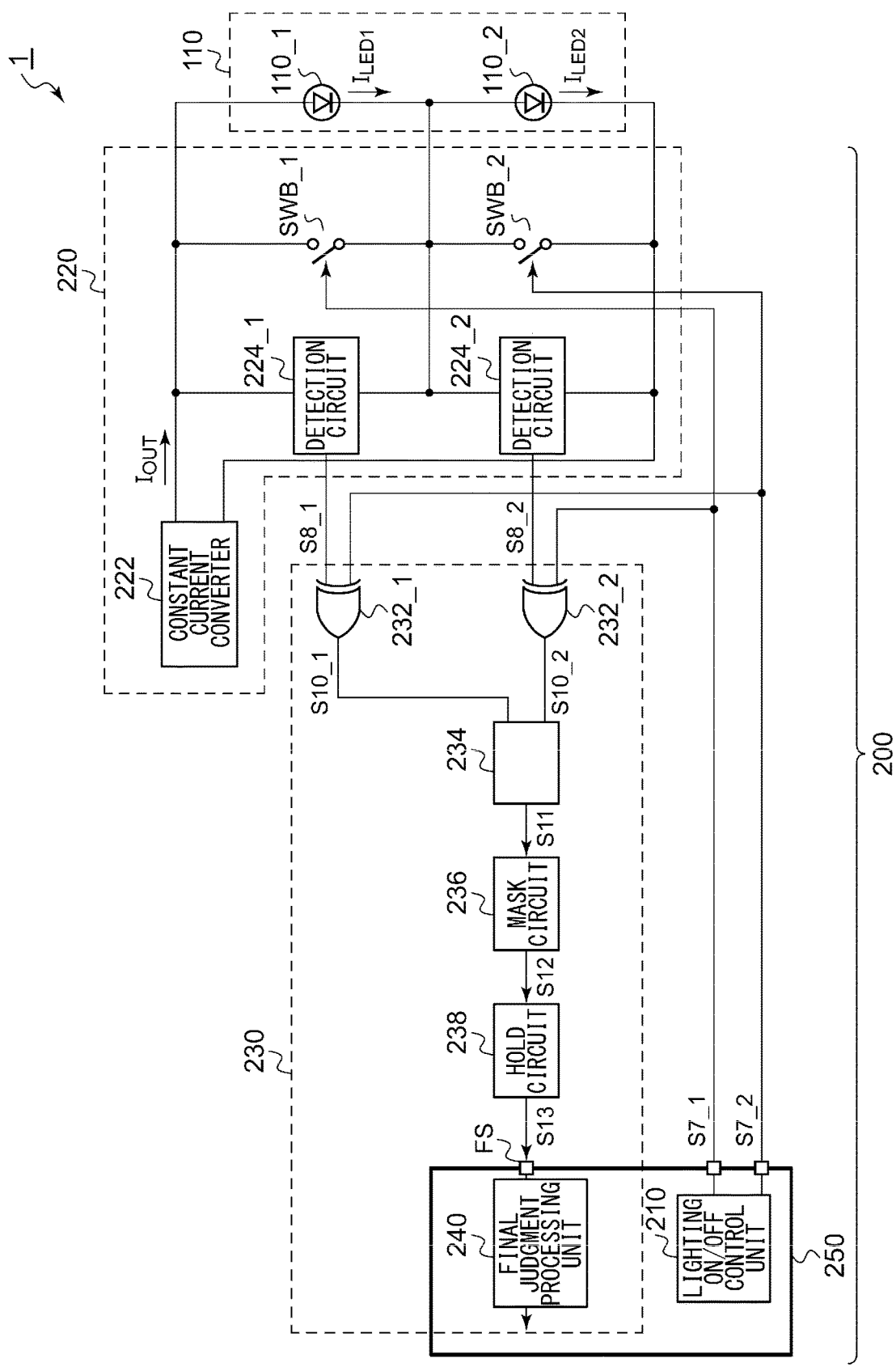
FIG. 10 is a block diagram showing an automotive lamp according to a first example configuration.

FIG. 10 is a block diagram showing the automotive lamp 1 according to a first example configuration. FIG. 10 shows only a block relating to the abnormal state judgment. That is to say, the other components such as the motor 130 and the position detector 202 are not shown.

In FIG. 10, the light source 110 includes multiple (two in this example) light sources 110_1 and 110_2 each configured such that they can be independently turned on and off. The two light sources 110_1 and 110_2 are coupled in series. The control apparatus 200 is capable of independently switching the two light sources 110_1 and 110_2 on and off in synchronization with the movement of the reflector.

The lighting circuit 220 includes a constant current converter 222, bypass switches SWB_1 and SWB_2, and detection circuits 224_1 and 224_2. The constant current converter 222 is configured as a step-down converter (Buck converter) or a step-up/step-down converter, and is configured to stabilize its output current IOUT to a predetermined current amount by feedback control.

The bypass switches SWB_1 and SWB_2 are arranged in parallel with the two light sources 110_1 and 110_2. When the bypass switch SWB_i (i=1, 2) is set to the off state, the output current IOUT of the constant current converter 222 is supplied as the driving current ILEDi to the light source 110_i, thereby turning on the light source 110_i.

When the bypass switch SWB_i (i=1, 2) is set to the on state, the output current IOUT of the constant current converter 222 is bypassed to the bypass switch SWB_i. Accordingly, this disconnects the flow of the driving current ILEDi to the light source 110_i, thereby turning off the light source 110_i.

The detection circuit 224_i (i=1, 2) detects whether or not the corresponding light source 110_i is actually in a lighting-on state or a lighting-off state, and generates a detection signal S8_i. Specifically, the detection circuit 224 is configured to be capable of comparing a predetermined threshold voltage Vth with the voltage that occurs across the corresponding light source 110. When the light source 110 is in the lighting-off state, the voltage across both electrodes thereof is substantially zero. In contrast, when the light source 110 is in the lighting-on state, the voltage across both electrodes thereof is the forward voltage Vf. Accordingly, the threshold voltage Vth may preferably be designed to satisfy the relation 0<Vth<Vf.

The lighting on/off control unit 210 generates instruction signals S7_1 and S7_2 that correspond to the light sources 110_1 and 110_2, respectively. The lighting on/off control unit 210 is implemented in the microcontroller 250. Accordingly, the function of the lighting on/off control unit 210 is defined by a software program.

The abnormal state judgment unit 230 includes first logic gates 232_1 and 232_2, a second logic gate 234, a mask circuit 236, a hold circuit 238, and a final judgment processing unit 240.

The first logic gates 232_1 and 232_2 correspond to the light sources 110_1 and 110_2, respectively. The logic gate 232_i (i=1, 2) generates an interim judgment signal S10_i that indicates whether or not the corresponding detection signal S8_i matches the corresponding instruction signal S7_i. For example, the logic gate 232 may be configured as an XOR (exclusive OR) gate. When the two input logical levels match, the interim judgment signal S10_i is set to the low level. Conversely, when the two input logical levels do not match, the interim judgment signal S10_i is set to the high level. In the following description, the state of the interim judgment signal S10 that indicates that the two input logical levels do not match will be referred to as the "asserted state", and the state of the interim judgment signal S10 that indicates that the two input logical levels match will be referred to as the "negated state".

The second logic gate 234 performs logical calculation on the two interim judgment signals S10_1 and S10_2, so as to integrate the two interim judgment signals into a single signal system. Specifically, when at least one from among the interim judgment signals S10_1 and S10_2 is asserted, the second logic gate 234 asserts its output S11. When both the interim judgment signals S10_1 and S10_2 are negated, the second logic gate 234 negates its output S11.

The mask circuit 236 removes noise that occurs in the interim judgment signal S11 thus integrated in the form of a single signal system. Specifically, the mask circuit 236 masks the assertion of the interim judgment signal S11 that occurs for a period of time that is shorter than the mask time. The mask time may preferably be determined giving consideration to a delay of the detection signal S8 with respect to the instruction signal S7. Specifically, the mask time may preferably be set to a period on the order of several dozen ms to 1 ms. The mask circuit 236 enables prevention of false detection due to such a delay. The mask circuit 236 may be configured as a low-pass filter or a delay circuit. The configuration of the mask circuit 236 is not restricted in particular.

The hold circuit 238 holds the assertion of the interim judgment signal S12 received via the mask circuit 236 for a hold period that is longer than each scanning period (e.g., 5 ms). In a case in which the control operation is performed such that the lighting-on period and the lighting-off period are always included in every scanning period, the hold circuit 238 thus provided allows an abnormal state judgment to be prevented from being canceled for every cycle. The hold period may be set to several dozen ms, for example. The hold circuit 238 may be configured as a filter circuit or a one-shot circuit. The configuration of the hold circuit 238 is not restricted in particular.

When the interim judgment signal S13 is continuously asserted for a predetermined judgment time, the final judgment processing unit 240 judges that an abnormal state has occurred as the final judgment. The judgment time is designed to be longer than the hold time. For example, the judgment time may be set to several hundred ms to several thousand ms.

Figure 11:
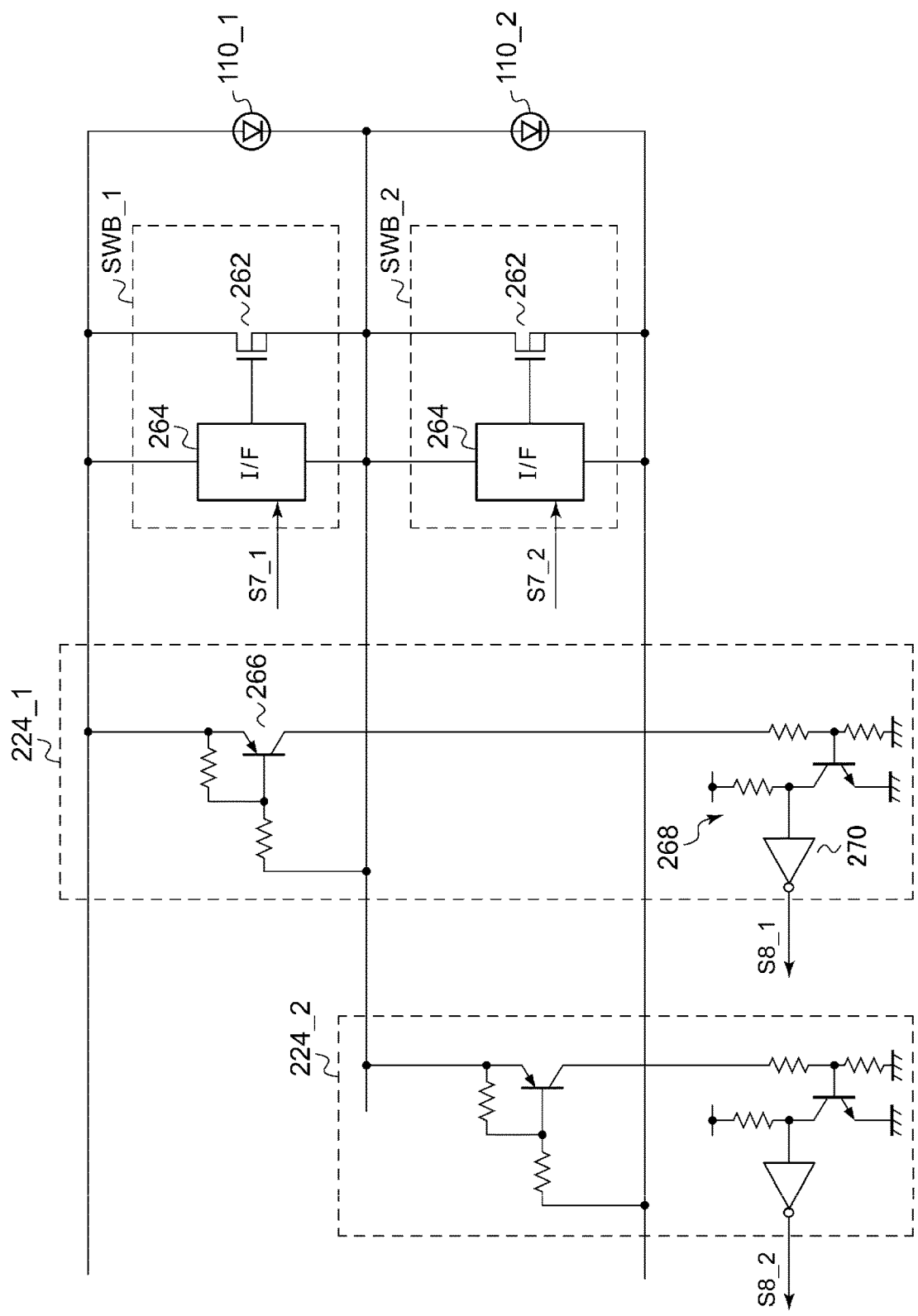
FIG. 11 is a circuit diagram showing an example configuration of a detection circuit and a bypass switch.

FIG. 11 is a circuit diagram showing a configuration example of the detection circuits 224 and the bypass switches SWB. The bypass switch SWB includes a MOS transistor 262 and an interface circuit 264. The MOS transistor 262 is arranged such that its source is coupled to the cathode of the corresponding light source 110, and its drain is coupled to the anode of the corresponding light source 110. The interface circuit 264 is configured as a level shifter. The interface circuit 264 appropriately level-shifts the instruction signal S7, so as to generate a gate signal for the MOS transistor 262.

The detection circuit 224 includes a detection transistor 266 and inverters 268 and 270. The detection transistor is configured as a PNP bipolar transistor. The voltage across the light source 110 is applied as a base-emitter voltage of the detection transistor 266. When the light source 110 enters the lighting-on state after the driving current ILED is supplied to the light source 110, the forward voltage Vf is applied as a base-emitter voltage of the detection transistor 266. This turns on the detection transistor 266, whereby a collector current flows. The inverter 268 receives the collector current that flows through the detection transistor 266, and converts the collector current into the detection signal S8 configured as a binary signal that is switchable between the high level and the low level. The inverter 270 inverts the output of the inverter 268, so as to generate the detection signal S8. The detection signal S8 indicates the on/off state of the detection transistor 266. Specifically, when the lighting-on state has been detected, the detection signal S8 is set to the high level. When the lighting-off state has been detected, the detection signal S8 is set to the low level.

Figure 12:
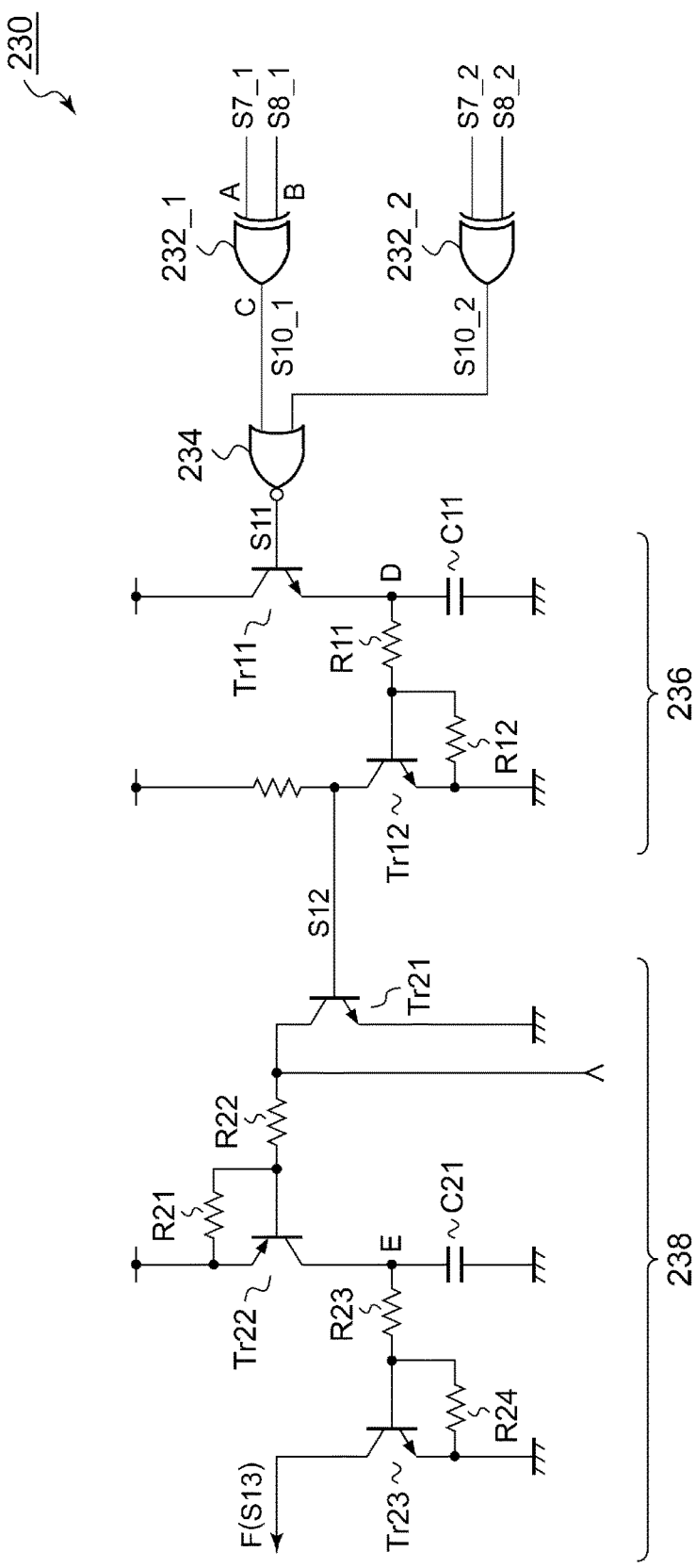
FIG. 12 is a circuit diagram showing an example configuration of an abnormal state judgment unit.

FIG. 12 is a circuit diagram showing an example configuration of the abnormal state judgment unit 230. The interim judgment signal S10 is asserted when judgment is made that an abnormal state has occurred. In FIG. 12, assertion (the mismatch state) is indicated by the high level. In contrast, negation (the match state) is indicated by the low level. The second logic gate 234 is configured as a NOR gate. When at least one from among the multiple interim judgment signals S10 is asserted (set to the high level), the output of the second logic gate 234 is asserted (set to the low level).

The mask circuit 236 is configured as a filter employing a capacitor. A capacitor C11 is arranged such that its one end is grounded. When the output S11 of the second logic gate 234 is negated (i.e., high level, which indicates the normal state), a transistor Tr11 is turned on, which charges the capacitor C11.

When the output S11 of the second logic gate 234 is asserted (i.e., low level, which indicates an abnormal state), the transistor Tr11 is turned off. In this state, the capacitor C11 is discharged via resistors R11 and R12, which gradually lowers the voltage across the capacitor C11. The mask time is determined by the resistors R11 and R12 and the capacitor C11.

The voltage D that occurs across the capacitor C11 is divided by the resistors R11 and R12. The voltage thus divided is input to the base of a transistor Tr12.

When the transistor Tr11 is turned on in the normal state, the voltage D across the capacitor C11 rises, which provides a collector current that flows through the transistor Tr12. This sets the interim judgment signal S12 to the low level after the noise mask is applied.

Conversely, when the abnormal state continues for the mask time, this lowers the voltage D across the capacitor C11. This disconnects the collector current of the transistor Tr12, which sets the interim judgment signal S12 to the high level.

A first-stage transistor Tr21 and resistors R21 and R22 included in the hold circuit 238 form an inverter that inverts the interim judgment signal S12. When the interim judgment signal S12 is set to the high level in the abnormal state, a collector current flows through the transistor Tr22, which charges a capacitor C21. This immediately raises the voltage E across the capacitor C21. When the interim judgment signal S12 is set to the low level in the normal state, the transistor Tr22 is turned off. In this state, the capacitor C21 is gradually discharged via the resistors R23 and R24, which gradually lowers the voltage E across the capacitor C21. The hold time described above is determined by the resistors R23 and R24 and the capacitor C12. The voltage E across the capacitor C12 is divided by the resistors R23 and R24. The voltage thus divided is input to the base of a transistor Tr23.

Figure 13:
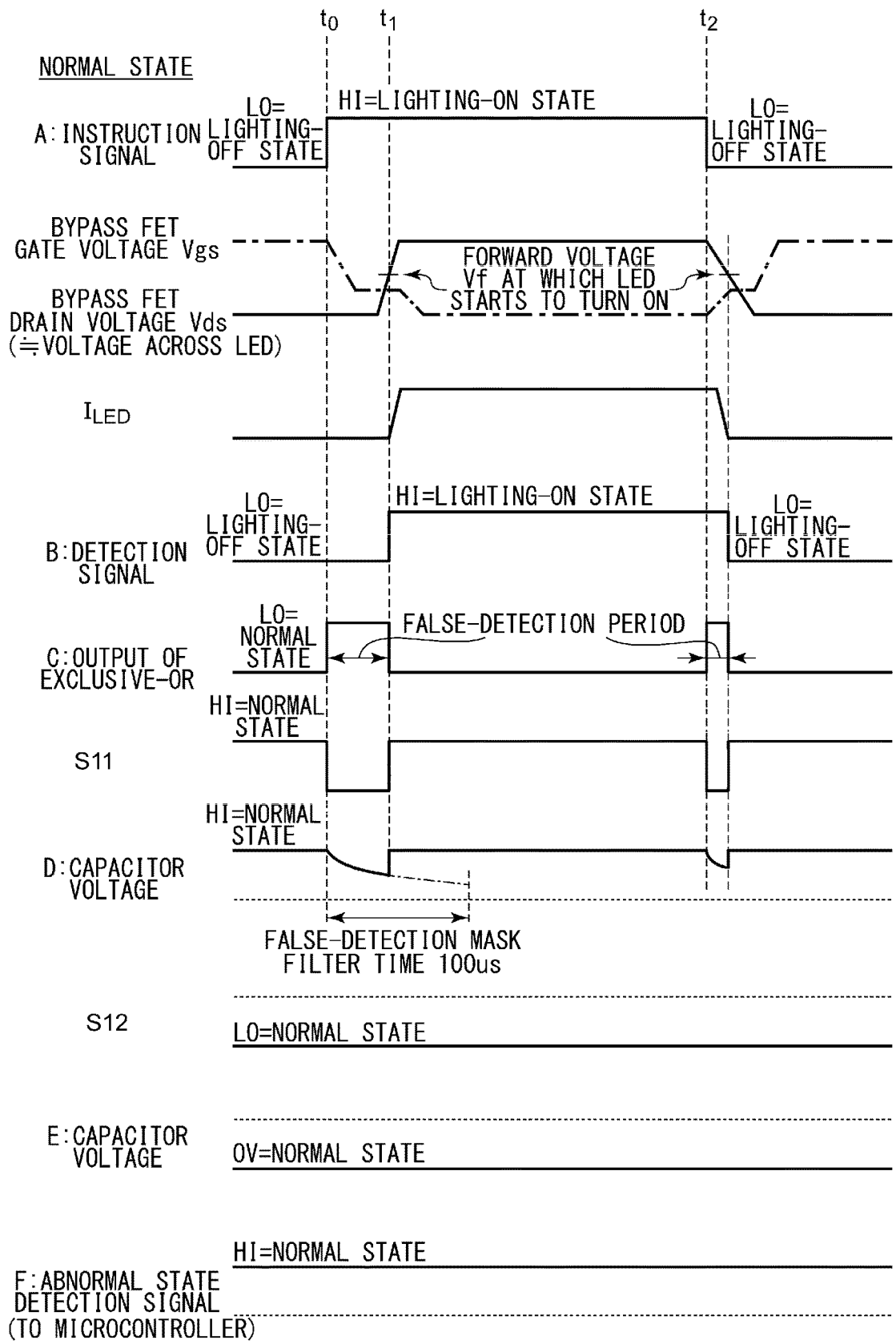
FIG. 13 is an operation waveform diagram showing the operation of the abnormal state judgment unit shown in FIG. 12 in a normal state.

FIG. 13 is an operation waveform diagram showing the operation of the abnormal state judgment unit 230 shown in FIG. 12 when the normal state is maintained. Before the time point t0, the instruction signal S7 is set to the low level, which indicates the lighting-off period. In the lighting-off period, the gate-source voltage Vgs of the MOS transistor (262 in FIG. 11) configured as the bypass switch SWB is set to the high level. In this state, the MOS transistor 262 is turned on, which sets the drain-source voltage Vds thereof to a voltage in the vicinity of zero.

At the time point t0, the instruction signal S7 transits to the high level. In this stage, the lighting-off period is switched to the lighting-on period. This lowers the gate-source voltage Vgs of the MOS transistor 262 configured as the bypass switch SWB, which turns off the MOS transistor 262. This raises the drain-source voltage Vds of the MOS transistor 262. When the drain-source voltage Vds exceeds the threshold voltage Vf of the light source 110 at the time point t1, the driving current ILED starts to flow through the light source 110, thereby turning on the light source 110.

During a period (t0 to t1) immediately after the time point t0, the detection signal B is set to the high level, which indicates the lighting-off state. Accordingly, although the circuit operates normally, the interim judgment signal C is temporarily set to the high level (asserted), which indicates the mismatch state. It should be noted that such a period in which the interim judgment signal C is temporarily asserted is shorter than the mask time defined by the mask circuit 236. This arrangement involves only a small reduction in the voltage D across the capacitor C11. This maintains the on state of the transistor Tr12. Accordingly, the output S12 of the mask circuit 236 remains at the low level, which maintains the voltage E across the capacitor C21 at 0 V. This maintains the output F of the hold circuit 238 at the high level, which indicates the normal state. At the time point t2, the instruction signal S7 transits to the low level. The subsequent operation is supported in the same manner.

FIG. 14 is an operation waveform diagram showing the operation of the abnormal state judgment unit 230 shown in FIG. 12 when a short-circuit state occurs in the load. Before the time point t3, the normal state is maintained. During such a period, the same operation is performed as that shown in FIG. 13.

At the time point t3, a short-circuit state occurs in the light source 110_1. In this state, the detection signal B is set to the low level, which sets the interim judgment signal C to the high level, which indicates the mismatch state. When the high-level period of the interim judgment signal C exceeds the mask time at the time point t4, the interim judgment signal S12 is set to the high level (asserted). In response to the assertion of the interim judgment signal S12, the voltage E across the capacitor C21 rises, which sets the abnormal state detection signal F to the low level. Subsequently, the voltage E across the capacitor C21 gradually decreases with time.

When the instruction signal A is set to the low level at the time point t5, the interim judgment signal C returns to the low level, which indicates the match state. At the time point t6, the instruction signal A is set to the high level. Accordingly, at the time point t7 after the mask time elapses, the interim judgment signal S12 is asserted again. In response to the assertion, the capacitor C21 is charged again, which returns the voltage E to the high level. In the high-level state of the voltage E across the capacitor C21, the abnormal state detection signal F is maintained at the low level.

At the time point t8, the state is returned to the normal state. Subsequently, when the transistor Tr23 is turned off after the voltage E across the capacitor C21 lowers, the abnormal state detection signal F is returned to the high level.

Description has been made above regarding the present invention with reference to the embodiments. The embodiment 1 has been described for exemplary purposes only, and is by no means intended to be interpreted restrictively. Rather, it can be readily conceived by those skilled in this art that various modifications may be made by making various combinations of the components or processes described above, which are also encompassed in the technical scope of the present invention. Description will be made below regarding such modifications.

First Modification

The detection circuit 224 may be configured using a photodiode. The presence or absence of light emission from the light source 110 may be directly monitored.

Second Modification

Description has been made in the embodiment regrading an arrangement including a pair of reflectors 100. However, the number of reflectors is not restricted in particular. Specifically, the number of reflectors may be one or three or more. Description has been made regarding an arrangement in which the reflectors 100 is rotationally driven. Also, the reflectors 100 may be reciprocally driven.

Third Modification

As the light source 110, various kinds of semiconductor light sources may be employed in addition to an LED. Examples of such semiconductor light sources include LDs (laser diodes), organic EL (electroluminescence), and the like.

Fourth Modification

Also, various modifications may be made for the configuration of the scanning light source 10. Description has been made in the embodiment regarding an arrangement in which the blade-type reflector is employed. However, the present invention is not restricted to such an arrangement. For example, a polygonal mirror or a mirror galvanometer may be employed. Also, a MEMS (Micro Electro Mechanical System) scan mirror may be employed.

Fifth Modification

The scanning light source 10 is not restricted to such a reflector type. Also, the direction of the light source 110 may be changed by means of an actuator.

Sixth Modification

Description has been made in the embodiment 2 regarding an arrangement in which the lighting-on state is assigned to a common level of the instruction signal S7 and the detection signal S8 and the lighting-off state is assigned to another common level. However, the present invention is not restricted to such an arrangement. For example, the lighting-on state of the light source may be assigned to different levels of the instruction signal S7 and the detection signal S8. In this case, when the comparison result between the two signals exhibits a mismatch state, judgment may preferably be made that a normal state is maintained. Conversely, when the comparison result between the two signals exhibits a match state, judgment may preferably be made that an abnormal state has occurred.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. An automotive lamp comprising:
   a scanning light source comprising a (i) semiconductor light source and (ii) a reflector structured to receive an output light from the semiconductor light source, and to repeat a predetermined periodic movement so as to scan a reflected light thereof ahead of the automotive lamp, wherein the scanning light source is adaptive to form a light distribution having a lighting-on region and a lighting-off region; and
   a control apparatus structured to control a lighting on/off state of the semiconductor light source in synchronization with a scanning operation of the reflector, wherein the on state of the semiconductor light source corresponds to the lighting-on region and the off state of the semiconductor light source corresponds to the lighting-off region,
   wherein the control apparatus comprises:
      a detection circuit structured to generate a detection signal indicative of whether or not the semiconductor light source is actually in a lighting-on state or a lighting-off state;
      a judgement unit structured to generate a judgement signal indicative of whether or not an instruction signal matches the detection signal; and
      a microcontroller adaptive:
         to generate the instruction signal for instructing the semiconductor light source to turn on and off;
         to generate an interrupt signal indicative of a timing at a predetermined time before a level of the instruction signal changes; and
         to detect an abnormality of the automotive lamp based on the judgement signal at the timing indicated by the interrupt signal.

2. The automotive lamp according to claim 1, wherein the control apparatus employs the timing before switching from a first lighting-on state to a lighting-off state and the timing before switching from a first lighting-off state to a lighting-on state as the judgement timing for every scanning period.

3. The automotive lamp according to claim 2, wherein a lighting-off period is inserted once for every scanning period such that the light reflected by the reflector does not illuminates both a left end and a right end of a light distribution pattern at the same time.

4. The automotive lamp according to claim 1, wherein the control apparatus comprises a bypass switch arranged in parallel with the semiconductor light source,
   and wherein the detection circuit is structured to compare a voltage across the semiconductor light source with a predetermined threshold value.

5. The automotive lamp according to claim 4, wherein the detection circuit comprises a detection transistor arranged such that a voltage across the semiconductor light source is applied as a base-emitter voltage thereof or a gate-source voltage thereof,
   and wherein the detection signal indicates an on/off state of the detection transistor.

6. The automotive lamp according to claim 1, wherein the judgement unit is implemented in the microcontroller.

* * * * *